US011892291B2

(12) United States Patent
Liu et al.

(10) Patent No.: US 11,892,291 B2
(45) Date of Patent: Feb. 6, 2024

(54) SYSTEMS AND METHODS IMPROVING OPTICAL COHERENCE TOMOGRAPHY (OCT) IMAGE RESOLUTION USING K-LINEARIZATION (KL) AND DISPERSION CORRECTION (DC)

(71) Applicant: LightLab Imaging, Inc., Westford, MA (US)

(72) Inventors: Chih-Hao Liu, Chelmsford, MA (US); Steven M. Stromski, Windham, NH (US)

(73) Assignee: LightLab Imaging, Inc., Westford, MA (US)

( * ) Notice: Subject to any disclaimer, the term of this patent is extended or adjusted under 35 U.S.C. 154(b) by 25 days.

(21) Appl. No.: 17/666,726

(22) Filed: Feb. 8, 2022

(65) Prior Publication Data

US 2022/0260360 A1 Aug. 18, 2022

Related U.S. Application Data

(60) Provisional application No. 63/146,904, filed on Feb. 8, 2021.

(51) Int. Cl.
*G01B 9/02* (2022.01)
*G01B 9/02091* (2022.01)
*G01B 9/02055* (2022.01)

(52) U.S. Cl.
CPC ..... *G01B 9/02091* (2013.01); *G01B 9/02064* (2013.01); *G01B 9/02084* (2013.01); *G01B 2210/58* (2013.01)

(58) Field of Classification Search
CPC ............ G01B 9/02091; G01B 9/02064; G01B 9/02084; G01B 9/02004; G01B 9/02072
See application file for complete search history.

(56) References Cited

U.S. PATENT DOCUMENTS

| 2012/0188555 A1* | 7/2012 | Izatt | G01B 9/02078 356/479 |
| 2014/0268038 A1* | 9/2014 | Schmoll | A61B 3/102 351/246 |
| 2016/0025478 A1* | 1/2016 | Johnson | G01B 9/02004 702/191 |

(Continued)

OTHER PUBLICATIONS

Attendu Xavier et al.: "Simple and robust calibration procedure for k-linearization and dispersion compensation in optical coherence tomography", Journal of Biomedical Optics, SPIE, 1000 20TH St. Bellingham WA 98225-6705 USA, vol. 24, No. 5, May 1, 2019 (May 1, 2019), p. 56001, XP060138478. 12 pgs.

(Continued)

*Primary Examiner* — Jonathan M Hansen
(74) *Attorney, Agent, or Firm* — Lerner David LLP

(57) ABSTRACT

Aspects of the disclosure relate to systems, methods, and algorithms to perform wavenumber linearization and dispersion correction in optical systems without the need for hardware modifications, empirical adjustments, precise mirror alignment, and which can be conducted at low computational costs and in real-time. A one-time calibration process can generate spectra or calibration criteria, including wavenumber-linearization criteria, dispersion correction, and spectral flattening spectra, which can be used to correct an optical coherence tomogram in real time.

18 Claims, 23 Drawing Sheets

Method 300

(56) References Cited

U.S. PATENT DOCUMENTS

2017/0307353 A1* 10/2017 Liu .................... G01B 9/02069
2020/0096311 A1   3/2020 Johnson et al.

OTHER PUBLICATIONS

Maciej Szkulmowski et al.: "Flow velocity estimation by complex ambiguity free joint Spectral and Time domain Optical Coherence Tomography", Science Opt. Commun. J. Biomed. Opt. Opt. Express Opt. Express Opt. Express Opt. Lett. Opt. Lett. Opt. Express Opt. Express Optics Express, Aug. 3, 2009 (Aug. 3, 2009), pp. 1178-1181, XP055682082.17 pgs.
International Search Report including Written Opinion for PCT/US2022/015644 dated May 19, 2022. 16 pgs.

* cited by examiner

199

200

Method 500

Method 700

SYSTEMS AND METHODS IMPROVING OPTICAL COHERENCE TOMOGRAPHY (OCT) IMAGE RESOLUTION USING K-LINEARIZATION (KL) AND DISPERSION CORRECTION (DC)

CROSS-REFERENCE TO RELATED APPLICATIONS

The present application claims the benefit of the filing date of U.S. Provisional Patent Application No. 63/146,904 filed Feb. 8, 2021, the disclosure of which is hereby incorporated herein by reference.

FIELD

The disclosure relates generally to the field of vascular system imaging and data collection systems and methods. In particular, the disclosure relates to methods of improving the resolution of images obtained in optical coherence tomography systems.

BACKGROUND

Optical Coherence Tomography (OCT) is an imaging technique which uses light to capture cross-sectional images of tissue on the micron scale. OCT can be used both in situ or in systems external to a sample organism.

The axial resolution of OCT images, and more particularly in Fourier-domain optical coherence tomography systems, can be degraded with broadening sidelobe artifacts by chromatic dispersion and non-linear wavenumber sampling. Many OCT systems sample the interference pattern with a non-uniform wavenumber (k) interval. This can introduce a "chirp" or noise into the signal which can depend on the path length difference the OCT signal takes.

Controlling both chromatic dispersion and nonlinear wavenumber sampling by wavenumber linearization, also known as k-linearization, are critical steps in preserving the resolution of OCT images.

Chromatic dispersion is inherent in optical systems and can be managed through carefully controlling the optical fibers and other components in the system. Wavenumber linearization poses a more difficult technical challenge and has been performed by applying numerical methods, such as numerical rescaling methods based on a fringe signal from a mirror in an OCT system, or through the use of an external sampling clock (k-clock) used in the current OPTIS integrated system commercially available through Abbott vascular. Although external k-clocks can attempt to linearize the nonlinear sampling intervals of wavenumbers, the precision of wavenumber linearization is limited in systems because of improper adjustment of k-clock delay and chromatic dispersion. Nonlinear sampling from k-delay errors leads to degradation of axial resolution and imaging artifacts such as broadening sidelobes. Even with the precise adjustment of k-delay, small amounts of system dispersion can directly degrade the resolution. In a dispersion-free system, the k-clock delay can be precisely adjusted by placing a mirror in the sample arm and minimizing the linewidth. However, in a dispersive system, the combination of k-linearization and chromatic dispersion leads to the k-delay adjustment which are only able to achieve optimal resolution at a specific depth. Further, even when a swept source OCT engine is optically optimized, electronics such as band-pass filters and cables can introduce unexpected wavenumber delays in an external sampling clock.

Algorithms have been proposed to digitally compensate the improper k-delays by calculating the "true" k-linearization spectrum that has to be decoupled from system dispersion. The fringe data is then resampled by interpolating the "true" k-spectrum to linearize the sampling in k-space. System dispersion is subsequently compensated by multiplying the interference signal with a counter-dispersive phase before a Fast Fourier transform (FFT). In general, calculating the system dispersion phase is an iterative process to optimize the $2^{nd}$ and $3^{rd}$ order dispersion coefficients based on the sharpness of the OCT mirror signal. However, the dispersion order varies among OCT systems. The requirement of a priori knowledge of dispersive orders may limit the feasibility of the iterative process in a commercial OCT system.

Although algorithms have been proposed to generate a "true" remapping table (wavenumber spectrum) to compensate for k-delays but such algorithms have hardware requirements which require measurement of the system dispersion, which makes the remapping table difficult or impractical to implement, particularly in commercial products. Other proposed methods to compensate the k-delay bias and the system dispersion are computationally intensive, requiring processing time up to tens of minutes, and need precise alignment of the imaged mirror positions making them infeasible to implement. Recently, there is an algorithm proposed to derive the system dispersion and compensate it after generating the remapping table in a dispersive system. Although this method is simple, effective and require no changes in hardware setup, insufficient precision of the calculated remapping table prevents the use on a practical cardiovascular application because the reported useful imaging depth after correction is only 1 mm (in air). To achieve the optimal imaging performance across entire imaging depth, one of the main focuses of this disclosure proposes a polynomial optimization process to improve the correctness of the 'true' remapping table and shows improvement in SNR and resolution at deeper depths. To date, the above-mentioned algorithms have been effective in compensating the k-nonlinearity and system dispersion in a controlled research environment, but they have various challenges preventing them from being feasible in a commercial OCT system.

SUMMARY

In part, the disclosure relates to a system and method of to simultaneously correct the issue of nonlinear sampling and chromatic dispersion without the need for additional hardware modification, a priori knowledge of dispersive order, precise mirror alignment, and computational cost associated with other systems and methods which have been proposed to date.

In part, the disclosure relates to systems and methods to obtain calibration data for an OCT system at a variety of calibration depth as well as a calibration process which optimizes the spectra using wavenumber linearization or k-linearization (KL), dispersion correction (DC), and spectral flattening (SF).

Aspects of the disclosed technology an algorithm to compensate the k-delay bias and system dispersion without additional hardware and a priori knowledge of the system dispersion. Further, aspects of the disclosed technology do not require the mirror positions to be precisely aligned at the same position by using their proposed phase shifting process.

Aspects of the disclosed technology allow for an increase in the useful imaging depth of a spectral domain OCT system and swept-source OCT system as compared to the limits of 14% and 20% in currently published methods. Aspects of the disclosed technology involves polynomial optimization processes by using 3 or more mirror sampling positions at different depths, with at least two depths in the positive imaging plane, to optimize the k-linearization spectrum and preserve the improved resolution and SNR across depths of 80% or more of the Nyquist depth. As one example, an imaging depth of more than 6 mm can be enabled by the disclosed technology at higher precision, improving OCT image resolution and SNR in applications such as detecting calcium plaque surrounding the coronary vessel (which requires depths of up to 6 mm).

Aspects of the disclosed technology do not require oversampling or any upscaling and can be implemented on the order of a few seconds enabling use of the product in real time. Further, the computational efficiency enables the proposed algorithms to be implemented on a live sample being imaged using OCT techniques.

Aspects of the disclosed technology eliminate the need for an external k-clock to compensate for non-linear sampling in k space. As one example, the proposed method improves the system signal-to-noise (SNR) ratio by 3-5 decibels (dB) by using the 1 GHz internal sampling rate of the analog-to-digital (A/D) card which is faster than the k-clock frequency. The faster internal sampling rate of the analog-to-digital card increases the sampling points which can enhance the image contrast after the Fourier Transform as the system noise is averaged incoherently but the signal adds coherently.

Aspects of the disclosed technology enable use within existing commercial intravascular OCT products through software or method changes to provide enhanced axial resolution by compensating the k-delay bias, system dispersion and spectral flattening, extended higher resolution depths by using the optimized KLDCSF spectrum and low computational cost.

Aspects of the disclosed technology enable the elimination of the k-clock and enable the use of the internal sampling provided by an analog-to-digital (A/D) card improving system SNR and imaging depth. This is especially ideal for future high-speed OCT systems as they require faster sampling rates to reach signals from deeper depths.

Aspects of the disclosed technology include a method of processing an optical signal to improve resolution of an optically acquired image. The method can comprise calibrating an optical system, the calibration comprising (i) acquiring, by one or more processors, at least a first mirror measurement and a second mirror measurement, the first and second mirror measurement being collected from either side of a zero-delay line, each mirror measurement being an interferogram or a signal or a system impulse response, (ii) obtaining, by the one or more processors, an amplitude and phase for the first mirror measurement and the second mirror measurement, (iii) resampling, at least one of the first mirror measurement and the second mirror measurement to be at least one of: (a) in linear wavenumber (k) space or (b) linear wavelength, to generate a resampled mirror measurement, and (iv) calculating, using a function, an optimized fit for the resampled mirror measurement. While two mirror measurements are used in some examples, in other examples additional mirror measurements may be used. For example, the calibration may be based on 3, 4, tens, hundreds, or any number of mirror measurements.

Aspects of the disclosed technology can include any combination of the following, including a method. The method can comprise calibrating an optical system, the calibration comprising (i) acquiring, by one or more processors, at least a first mirror measurement and a second mirror measurement, the first and second mirror measurement being collected from either side of a zero-delay line, each mirror measurement being an interferogram or a signal or a system impulse response, (ii) obtaining, by the one or more processors, an amplitude and phase for the first mirror measurement and the second mirror measurement, (iii) resampling, at least one of the first mirror measurement and the second mirror measurement to be at least one of: (a) in linear wavenumber (k) space or (b) linear wavelength, to generate a resampled mirror measurement, and (iv) calculating, using a function, an optimized fit for the resampled mirror measurement. The function used to resample the data can be one of a polynomial function, cubic or other spline fitting function, radial basis function, or a piece-wise function. K-linearization can be performed on the raw interferogram of mirror measurements with and without k-clocks, and generate the resampled interferogram, wherein the resampled mirror measurement is in k-space. Optimization of the K-linearization function can be based on a polynomial fitting order of order 1 to n, where n is a fixed integer. The polynomial fitting order minimizing the sum of: (i) the area of point-spread function and/or (ii) full-width half max (FWHM) resolution for each of the mirror measurements can be found as part of the method. The optimized polynomial can be determined based on two or more mirror measurements. A dispersion spectrum or criteria can be calculated for at least one mirror measurement and a compensation can be calculated. A dispersion compensation, dispersion factor, or dispersion criteria can be calculated using two mirror positions with one position on either side of the "zero-delay line". Spectral flattening can be performed on at least one mirror measurement by using an envelope calculated from a specific mirror measurement. A spectral envelope calculated during spectral flattening can be saved. Each mirror measurement of the plurality of mirror measurements can be a system impulse response. Calibration criteria related to (i) k-linearization (KL), (ii) dispersion correction (DC), and (iii) spectral flattening (SF) can be saved. An OCT signal or interference signal from a specimen can be received. A new fringe can be generated or an interferogram can be resampled after linear k-interpolation to k-linearize the received OCT signal or interference signal by using the KL calibration criteria can be generated. Dispersion correction can be performed on the k-linearized OCT signal or interference signal using the DC calibration criteria. The envelope of the k-linearized and dispersion corrected OCT signal or interference signal can be removed. The OCT signal or interference signal can be converted to an OCT image for display on a display.

Aspects of the disclosed technology include a method. The method can comprise generating an OCT image from an OCT signal, the method comprising obtaining an OCT signal corresponding to a specimen, wavelength (k) linearizing the OCT signal to generate a k-linearized (KL) OCT signal, dispersion correcting (DC) the KL OCT signal to generate an KL DC OCT signal, spectral flattening (sf) the KLDC OCT signal to generate a final KLDCsf OCT signal, and performing post-processing on the final OCT signal to generate an OCT image. The KL OCT signal, KL DC OCT signal, and final KLDCsf OCT signal are based on calibration criteria generated at a calibration stage. The OCT signal can be an interferogram. The calibration criteria can be generated at the calibration stage using at least a first mirror measurement and a second mirror measurement, the first and second mirror measurement being collected from either side of a zero-delay line, each mirror measurement being an interferogram or a signal or a system impulse response.

Aspects of the disclosed technology include a system for displaying sets of images. The system can comprise a memory for storing image data and time varying data that corresponds to a subject, one or more processors in communication with the memory. The one or more processors can be operable to acquire a first mirror measurement and a second mirror measurement, the first and second mirror measurement being collected from either side of a zero-delay line, each mirror measurement being an interferogram or a signal or a system impulse response; compute, by the one or more processors, an amplitude and phase for the first mirror measurement and the second mirror measurement, resample, at least one of the first mirror measurement and the second mirror measurement to be at least one of: (i) in linear wavenumber(k) space, and (ii) linear wavelength, to generate a resampled mirror measurement, and calculate, using a function, an optimized fit for the resampled mirror measurement. The system can be configured to perform the steps of any of the preceding methods.

Aspects of the disclosed technology include a system for performing optical coherence tomography on a sample. The system can comprise a light source, a reference mirror with variable position, a display, a memory for storing image data that corresponds to a sample, one or more processors in communication with the memory. The one or more processors can be operable to obtain at least one calibration parameter each time the system is initiated, obtain a signal from the sample, apply the at least one calibration parameter to the obtained signal, the calibration parameter being at least one of a wavelength linearization, a dispersion correction, or a spectral flattening parameter, and generate an image from the corrected obtained signal. The system can further comprise an optical switch and a calibration mirror configured to cause a calibration signal to be generated. The system can be configured to perform the steps of any of the preceding methods.

It should be understood that the different aspects and embodiments disclosed herein can be integrated together as a whole or in part, as appropriate. Thus, each example disclosed herein can be incorporated in each of the aspects to varying degrees as appropriate for a given implementation. Further, the various software-based tools to address medical imaging problems and other related challenges and problems and parts of the foregoing can be used for medical applications and other applications for displaying information relating to stents, blood vessels, and two and three-dimensional views thereof without limitation. Other features and advantages of the disclosed examples will be apparent from the following description and accompanying drawings.

Although, the disclosure relates to different aspects and examples and other features as recited and depicted herein, it is understood that the each of the foregoing disclosed herein can be integrated together as a whole or in part, as appropriate. Thus, each example disclosed herein can be incorporated in each of the aspects to varying degrees as appropriate for a given implementation. Further, the various methods and techniques described herein can be used with various imaging modalities.

Other features and advantages of the disclosed examples will be apparent from the following description and accompanying drawings.

BRIEF DESCRIPTION OF THE DRAWINGS

FIG. 4B also shows effective correction on uncalibrated k spectrum by applying KL process. The dash line is the optical phase calculated after k-linearization process.

DETAILED DESCRIPTION

Figure 1A:
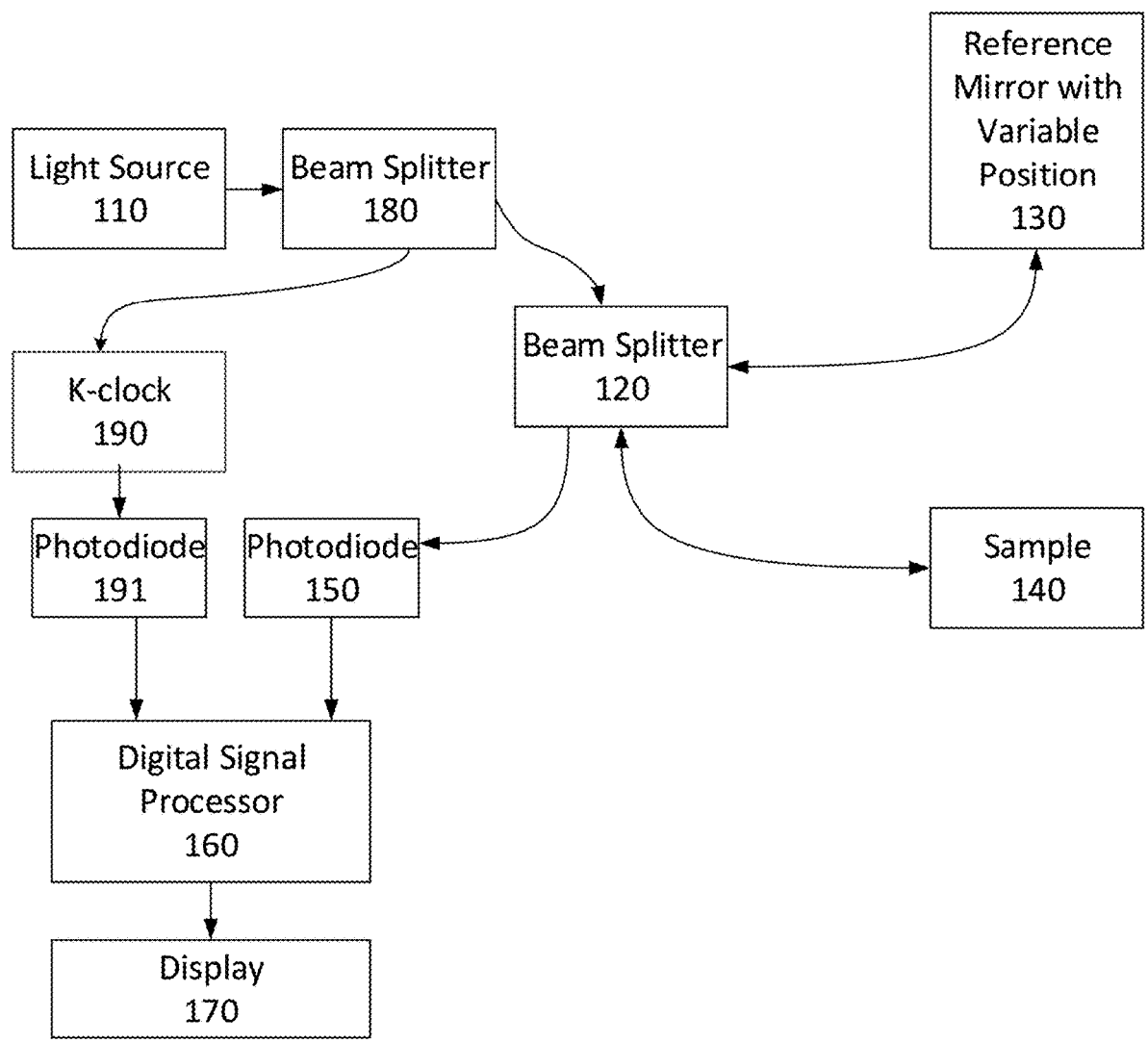
FIG. 1A shows a schematic diagram of an imaging and data collection system in accordance with aspects of the disclosure.

In part, the disclosure relates to a calibration process which can calculate the spectra of k-linearization (KL), dispersion, and spectral flattening. The calibration process can provide a set of calibration spectra. OCT signals, including raw fringe data, with a mirror in the sample arm can be acquired from the positive and negative planes separately by adjusting the reference arm path distance. Calibration spectra can be calculated based on the phase retrieved by using a Hilbert transform process.

In part, the disclosure relates to utilizing an obtained calibration spectra to modify or correct an interferogram prior to Fast Fourier Transform (FFT) processing. The calibration spectra can be used to linearize future fringe data acquired by the system in wavenumber domain for an improved interferogram. In some examples, wavenumber sampling can be linearized by interpolation using the calibration spectrum (k-linearization). Dispersion can be corrected by applying a Hilbert transform and multiplication with the dispersion spectrum of the k-linearized interferogram.

In part, the disclosure can further relate to suppression of sidelobe artifacts caused from non-uniform laser intensity during a spectral sweep through the flattening of the spectral envelope of the laser source to optimize the laser bandwidth.

In part, aspects of the disclosure provide systems and method that correct not only k-spectrum nonlinearity, but also the dispersion and asymmetric laser sweep intensity separately by using the calibrated spectra with signal processing steps. The disclosure allows for an optimized optical resolution to be maintained across the entire imaging depth. Furthermore, the algorithms, methods, and systems discussed in this disclosure can also work with without a k-clock providing an option to improve system SNR by using the internal sampling rate of the digitizer which is typically faster than the maximum frequency of the k-clock.

In some aspects of the disclosure, an OCT imaging engine includes an internal reference reflector, or calibration mirror, for automatically receiving information corresponding to the quality of the OCT imaging engine. The reference reflector may be internal to a sample arm of the OCT imaging engine can be used to receive optical signals for performing various diagnostic processes for quantifying the performance of the OCT imaging engine. For example, the OCT imaging engine can self-assess its performance by computing system performance data, which can include one or more of a point-spread function (PSF), a Full-Width Half Maximum (FWHM), a noise level, signal-to-noise ratio, and the dynamic range of the system. The reference reflector may be coupled to the rest of the OCT imaging engine through an optical switch, allowing the OCT imaging engine to switch between an imaging mode and a self-inspection mode. The OCT imaging engine can sample optical signals for generating a calibration spectra, using a reference reflector internal to the system. Because the reference reflector is internal, the OCT imaging engine can perform the self-inspection and calibration automatically, without requiring user input or an external device to be connected to the system first.

As used in this disclosure, and as would be understood by a person of skill in the art, a system impulse response or an impulse response is the response to a brief input signal, which is the impulse. In optics, a system impulse response can be the response obtained from an impulse of light on a sample. In some examples, the system impulse response can be the reflection obtained from a single mirror in a sample arm (as explained below). In some examples, the system impulse response is obtained from a wavelength swept laser.

As used in this disclosure, an interferogram or an interference pattern can be a pattern formed by wave interference, such as for example, by interference of waves of light from a reference arm and a sample arm of an OCT system. An interferogram can also be thought of as a time varying signal which can be converted using an analog to digital converter.

Example Systems

OCT is a catheter-based imaging modality that uses light to peer into coronary artery walls and generate images thereof for study. Utilizing coherent light, interferometry, and micro-optics, OCT can provide video-rate in-vivo tomography within a diseased vessel with micrometer level resolution. Viewing subsurface structures with high resolution using fiber-optic probes makes OCT especially useful for minimally invasive imaging of internal tissues and organs. This level of detail made possible with OCT allows a user to diagnose as well as monitor the progression of coronary artery disease.

OCT imaging of portions of a patient's body provides a useful diagnostic tool for doctors and others. For example, imaging of coronary arteries by intravascular OCT may reveal the location of a narrowing or stenosis. This information helps cardiologists to choose between an invasive coronary bypass surgery and a less invasive catheter-based procedure such as angioplasty or stent delivery. Although a popular option, stent delivery has its own associated risks.

FIG. 1A illustrates an example OCT system 100 according to aspects of this disclosure. In some examples, OCT system 100 is or incorporates an optical interferometer. A person of skill in the art will appreciate that although one configuration of an OCT system is illustrated in FIG. 1, variations of the system, and different implementations, such as in-vivo OCT systems are within the scope of the disclosure. Direction of light or electrical signals is indicated by arrows within FIG. 1.

Light source 110 can be a source of low-coherence light able to capture micro-meter or lower levels of resolutions. The light source can generate light which is in the visible wavelength range as well as light beyond that wavelength range. In some examples, ultra-broad output of the wavelength of light is desirable. In some examples a laser can be used as a light source. In yet other examples, a light emitting diode can be used as a light source. In some examples, light generated at light source 110 can be sent through a collimation lens.

Light from light source 110 can be sent to beam splitter 120. Beam splitter 120 can be an optical device which splits a beam of light from light source 110 into two or more beams. Light split by beam splitter can move to reference mirror 130 and to sample 140. Aspects of reference mirror 130 are explained further with respect to FIG. 1B. Sample 140 can be an organic sample or other sample upon which OCT can be performed. In some examples, sample 140 can be studied internally as is the case with in-vivo OCT scans.

Light can be reflected from both reference mirror 130 and sample 140 through an optical path which crosses the beam splitter and directs the light to photodiode 150. Photodiode 150 can be a semiconductor or other device which converts light into an electrical current and enables the detection of light. Current or another electrical signal is generated in photodiode when photons or waves of light are incident to the photodiode. Photodiode 150 may contain multiple optical filters, lens, or other components to focus light and increase a signal to noise ratio. Signals generated at photodiode 150 may be converted from an analog to a digital signal and processed by a digital signal processor 160. A digital signal processor can be a specialized microprocessor or integrated chip with architecture and/or software optimized for the operational needs of digital signal processing. In some examples, digital processor 160 can enable the information generated at photodiode 150 to be processed and sampled by the k-clock signal at 191 and converted into an image for display on display 170. As explained further below, digital signal processor can perform one or more of the steps described below with optimizing the image generated from studying or observing sample 140. Display 170 can display an image related to sample 140. As non-limiting examples display 170 may be a monitor, OLED screen, LCD screen, television, electroluminescent display, or quantum dot display. Other specialized screens or displays for specialized contrast ratios or ease of displaying OCT information can also be used as display 170.

K-clock 190 in also illustrated in FIG. 1A. When the arrival time of the signal from the k-clock output to the A/D card is not synced with the signal from the main interferometer to the A/D card the interferogram cannot be sampled correctly. Syncing problems can be introduced by mismatched optical fiber lengths and electronic connections after the photodiode 191 and 150, such as for example, bandpass filters or electrical cable lengths. In some examples, only a few percent, such as 2-3% of the light can be transmitted to the k-clock. K-clock 190 can consist of a 90° phase shifter, zero-crossing detection units, XOR gate or an OR gate, or any combination of similar elements.

Beam splitter 180 can also split light to a k-clock 190 and beam splitter 120. In some examples, a small amount of light can be transmitted through the beam splitter to the k-clock Photodiode 191 can be similar to photodiode 150 and be connected to the k-clock and analyze light incident on photodiode 191. Photodiode 191 can be connected to digital signal processor 160. As a portion of the light is transmitted through the k-clock, that light can be analyzed separately from the light incident or obtained from the sample 140.

A person of skill in the art should understand that although reference is given in FIG. 1 to various optical components, equivalent components can be used or interchanged with system 100 described above. In some examples fiber optics and related optical components, such as optical couplers, can be used in lieu or in conjunction with the components described herein. For example, a person of skill in the art will appreciate that rather than using a collimation lens and beam splitter, optical couplers can be used to achieve the same or an equivalent setup as described with respect to FIG. 1A. Light can take a pathway as determined by the fiber optic wire. The use of optical fibers and optical couplers can provide a more robust and simpler optical setup for use in commercial OCT applications. As one example, beam splitter 180 and beam splitter 120 can consist of fiber optic couplers which split one input fiber into two output fibers, and split input light into two paths.

In some examples, various components can be linked, controlled, communicated with through suitable a computing system, such as computing system 200 further described below with reference to FIG. 2.

Figure 1B:
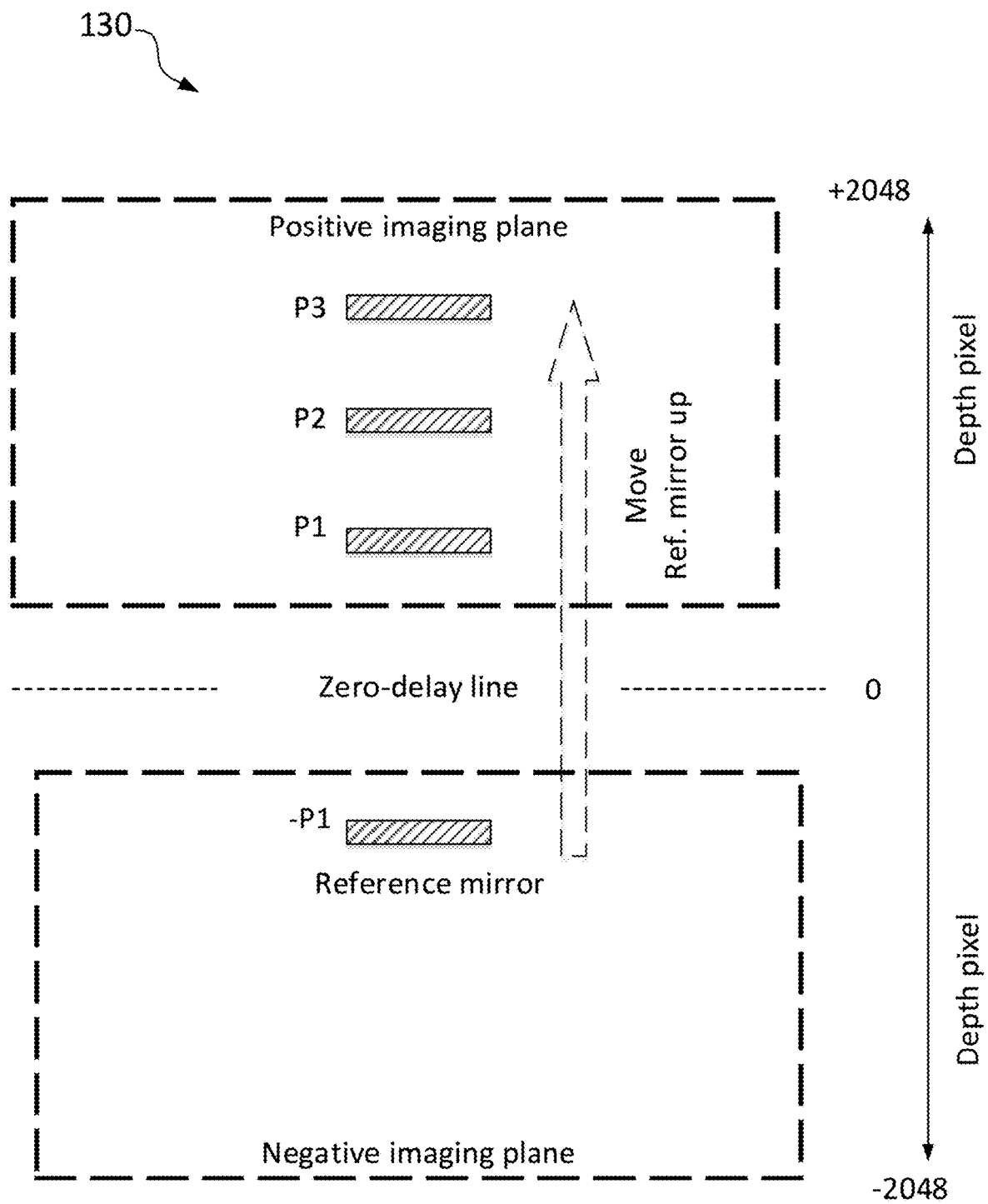
FIG. 1B shows exemplary positioning of a reference mirror of an example in accordance with aspects of the disclosure.

FIG. 1B illustrates aspects of reference mirror 130. Reference mirror 130 can be a mirror or other reflective surface with high reflectivity and optical properties to enable reflection of photons. Reference mirror 130 can be included in a reference arm of OCT system 100. By scanning the mirror in the reference arm along with light from sample 140, an interference pattern can be generated from which an OCT image can be reconstructed. As illustrated in FIG. 1B, when a mirror is placed at the sample 140 reference mirror 130 can be moved at various positions on either side of a "zero-delay line." Various positions, such as positions P1, P2, and P3 can move the image of the mirror to different depth pixels. Position −P1 and P1 can be either equidistant to the zero-delay line or not. Although only −P1 and P1-P3 are illustrated for simplicity, any ordered and finite number of positions can exist. For example, an additional position P4 can exist which is at a greater positive pixel depth than position P3. In an example, the pixel depth can range from +1024 pixels to −1024 pixels. The pixel depth can depend on the half of the total amount of the pixels numbers used before FFT, according to k-clock total samples or internal sampling rate of A/D cards, and zero-padded data length before FFT. The imaging depth from pixel depth 0 to pixel depth 1024 is determined by the formula: {(central wavelength)$^2$/(2*laser bandwidth)}*(0.5*total number of the sample point from an OCT fringe).

In some examples, the position of reference mirror 130 can change the interference pattern generated from light returning from sample 140. In other examples, the position of the reference mirror 130 can be used to generate information related to the performance of the optical system and be used in the methods described herein. In some example, information generated from positions P1 and P2 can be used to calculate the spectra wavelength linearization and the spectral flattening spectra, as further explained with reference to FIG. 6C.

Figure 1C:
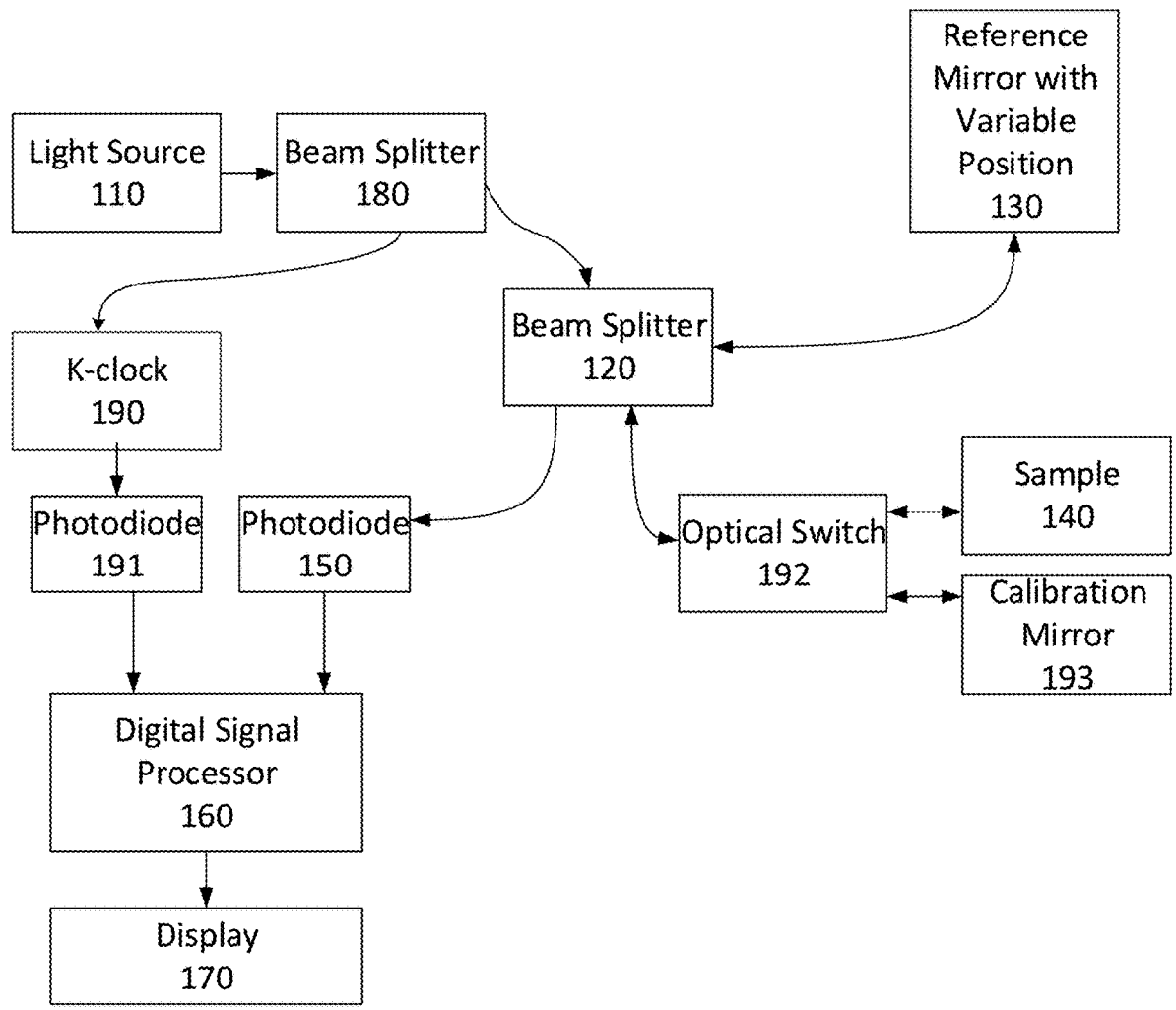
FIG. 1C shows a schematic diagram of an imaging and data collection system in accordance with aspects of the disclosure.

FIG. 1C can illustrates an OCT system with an integrated mirror in the sample arm, system 199. FIG. 1C shows that system 199 can be similar to system 100, but can further contain an additional calibration mirror 193 and an optical switch 192. Optical switch 192 can be optically coupled between the beam splitter 120 on one end and between sample 140 and calibration mirror 193 on the other end. The signal from the calibration mirror 193 in conjunction with the variable position reference mirror 130 will allow the system to perform the KLDCsf method in an automated or semi-automated process. In some examples, the "self-diagnose" procedure can be run every time the system is started or a new optical joint is included or changed at any part of the system.

Figure 1D:
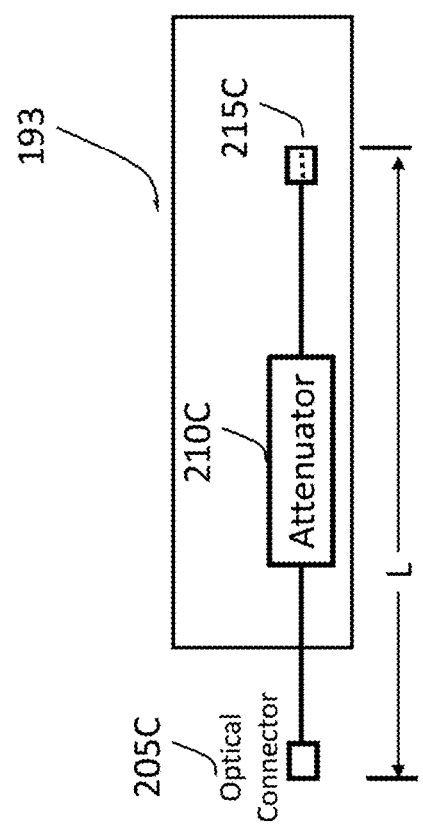
FIG. 1D is a block diagram of an example calibration mirror, according to aspects of the disclosure.

FIG. 1D is a block diagram of the calibration mirror 193 of FIG. 1C, according to some examples. The calibration mirror 193 can include an optical connector 205C, connecting the calibration mirror 193 to the switch 192. Alternatively, the calibration mirror 193 can be fusion spliced to connect to the switch 192. The calibration mirror 193 can include an attenuator 210C. The attenuator 210C can have a predetermined attenuation, for example attenuating the reflected signal so the magnitude of the reflection is similar to a reflection from the sample 140. The calibration mirror 193 can include a flat surface 215C for providing a single point reflection. The length of the optical fiber can have the same optical path length as the sample 140 so the light reflected from 215C will interfere with the reference arm. The single-point reflection may be referred to as the Point Spread Function (PSF) and may be processed by the DSP 160 or other component of the OCT imaging engine for obtaining information quantifying the OCT imaging engine.

According to some examples, the OCT imaging engine receives mirror measurements using the reference mirror and the calibration mirror. A mirror measurement can include a time-varying amplitude of an interferogram. The system can use the received measurements to retrieve the phase of the optical signal as a function of the sampling index.

Figure 2:
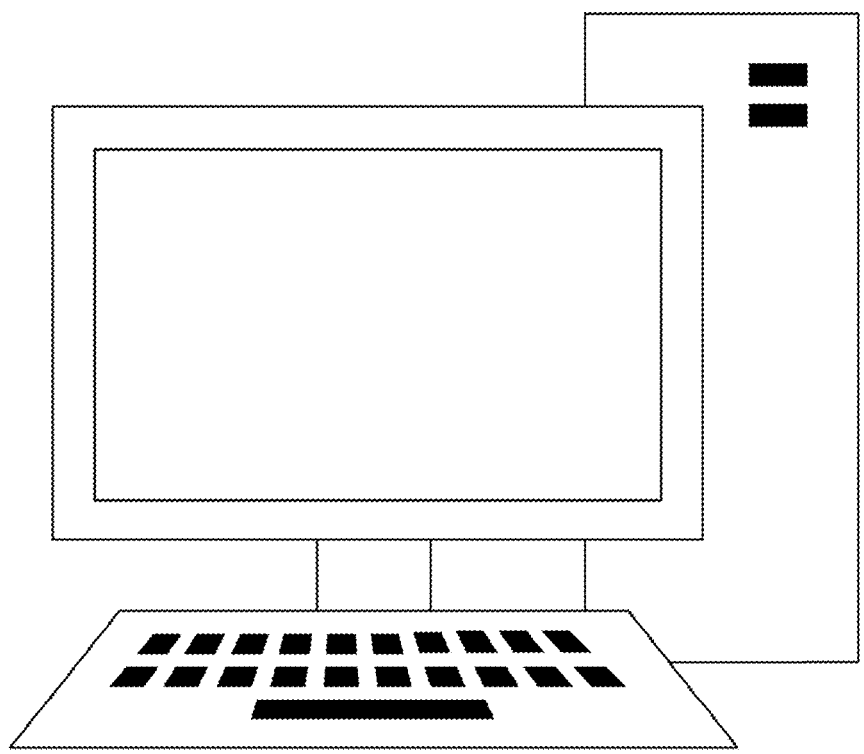
FIG. 2 shows an example computing device to conduct imaging and data collection in accordance with aspects of the disclosure.

FIG. 2 illustrates an example computing system 200. Computing system 200 can include hardware, software, and other modules as further described herein. The following description is intended to provide an overview of device hardware and other operating components suitable for performing the methods of the disclosure described herein which can be part of computing system 200. This description is not intended to limit the applicable environments or the scope of the disclosure. Similarly, the hardware and other operating components may be suitable as part of the apparatuses described above. The disclosure can be practiced with other system configurations, including personal computers, multiprocessor systems, microprocessor-based or programmable electronic device, network PCs, minicomputers, mainframe computers, and the like. The disclosure can also be practiced in distributed computing environments where tasks are performed by remote processing devices that are linked through a communications network such as in different rooms of an OCT laboratory or catheter laboratory.

Some portions of the detailed description are presented in terms of algorithms and symbolic representations of operations on data bits within a computer memory. These algorithmic descriptions and representations can be used by those skilled in the computer and software related fields. In one example, an algorithm is here, and generally, conceived to be a self-consistent sequence of operations leading to a desired result. The operations performed as methods stops or otherwise described herein are those requiring physical manipulations of physical quantities. Usually, though not necessarily, these quantities take the form of electrical or magnetic signals capable of being stored, transferred, combined, transformed, compared, and otherwise manipulated.

Unless specifically stated otherwise as apparent from the following discussion, it is appreciated that throughout the description, discussions utilizing terms such as "processing" or "computing" "overlaying" or "searching" or "detecting" or "measuring" or "calculating" or "comparing" "generating" or "determining" or "displaying," or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The present disclosure, in some examples, also relates to apparatus for performing the operations herein. This apparatus may be specially constructed for the required purposes, or it may comprise a general-purpose computer selectively activated or reconfigured by a computer program stored in the computer.

Example systems of the disclosure may be embodied in many different forms, including, but in no way limited to, computer program logic for use with a processor (e.g., a microprocessor, microcontroller, digital signal processor, or general purpose computer), programmable logic for use with a programmable logic device, (e.g., a Field Programmable Gate Array (FPGA) or other programmable logic device), discrete components, integrated circuitry (e.g., an Application Specific Integrated Circuit (ASIC)), or any other means including any combination thereof. In one example, some or all of the processing of the data collected using an OCT probe and the processor-based system is implemented as a set of computer program instructions that is converted into a computer executable form, stored as such in a computer readable medium, and executed by a microprocessor under the control of an operating system. Thus, query response and input data are transformed into processor understandable instructions suitable for generating imaging data, detecting lumen borders, detecting stent struts, comparing measured perpendicular distances relative to set thresholds, and otherwise performing image comparison, signal processing, lumen detection, stent detection, and comparison of detected stents, and other features and examples described above.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Various examples of suitable processing modules are discussed below in more detail. As used herein a module refers to software, hardware, or firmware suitable for performing a specific data processing or data transmission task. In some examples, a module refers to a software routine, program, or other memory resident application suitable for receiving, transforming, routing and processing instructions, or various types of data such as OCT scan data and other information of interest.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system.

Memory may also include any means for storing software or other instructions including, for example and without limitation, a hard disk, an optical disk, floppy disk, DVD (digital versatile disc), CD (compact disc), memory stick, flash memory, ROM (read only memory), RAM (random access memory), DRAM (dynamic random access memory), PROM (programmable ROM), EEPROM (extended erasable PROM), and/or other like computer-readable media.

In general, computer-readable memory media applied in association with examples of the disclosure described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with examples of the disclosure.

A storage medium may be non-transitory or include a non-transitory device. Accordingly, a non-transitory storage medium or non-transitory device may include a device that is tangible, meaning that the device has a concrete physical form, although the device may change its physical state. Thus, for example, non-transitory refers to a device remaining tangible despite this change in state.

Example Methods

Figure 3:
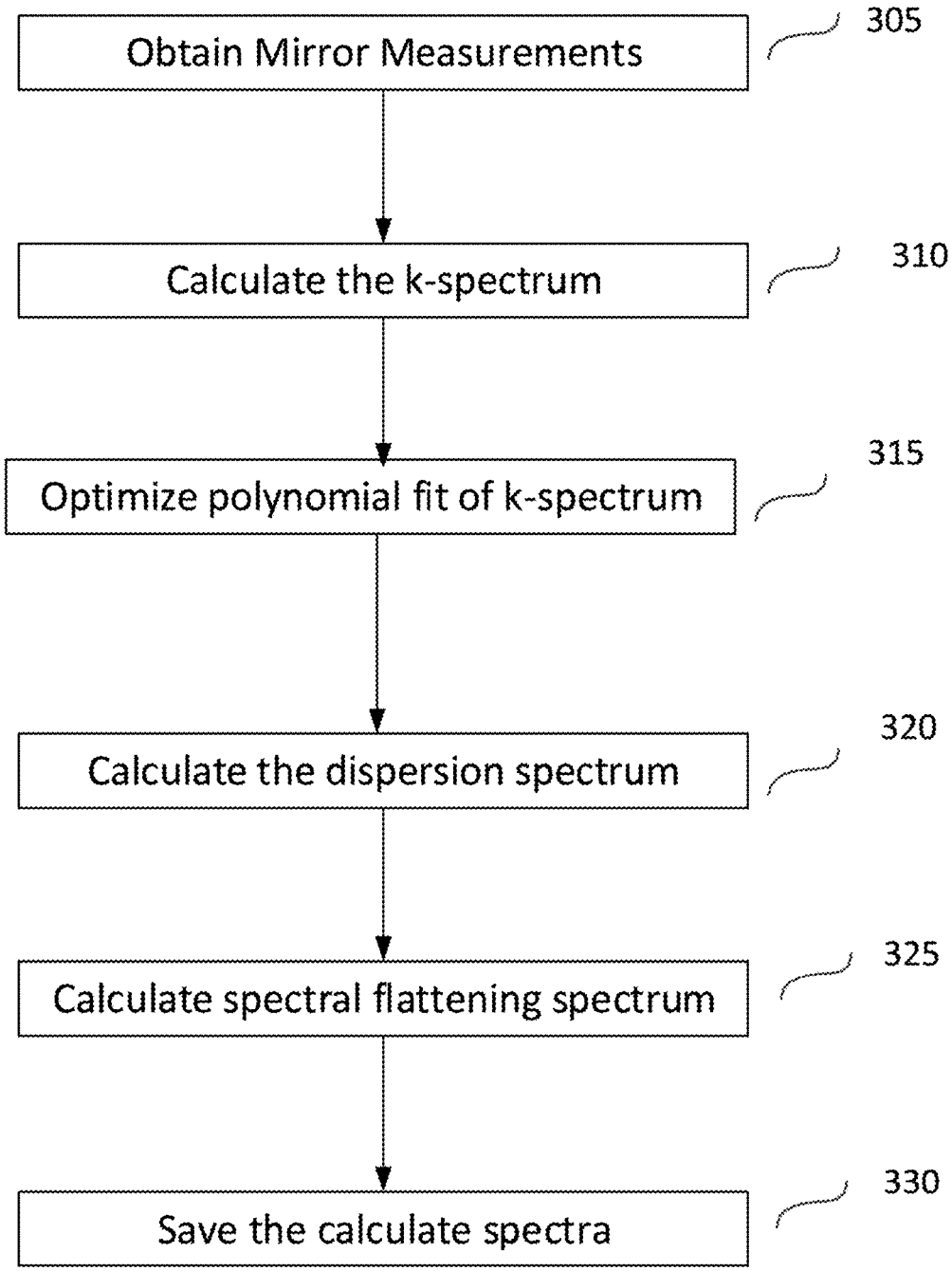
FIG. 3 shows a flow diagram of a method in accordance with aspects of the disclosure.

FIG. 3 illustrates method 300 for obtaining one or more calibration spectra. The calibration spectra can be used for calibration of OCT signals derived from a sample, such as sample 140, to improve resolution, signal to noise ratio and suppress image sidelobe artifacts.

As used with reference to method 300, the following notation can be used. The equations below can be derived and understood with reference to the notation. A person of skill in the art will understand that equivalent and similar steps, symbols, and notation can be used.

k: wavenumber.
j: imaginary unit in complex domain.
KL: k-linearization.
DC: dispersion correction.
SF: spectral flattening.
n: sampling index by the used A/D card.
I: intensity
$I_{P1}(n)$: Intensity at position P1 with n being a variable of sampling index by A/D card.
$z_x$: depth position x with respect to the zero delay plane.
Px: The imaged position x on the positive plane, where x=1, 2, 3 . . . etc.
−Px: The imaged position x on the negative plane.
$\Phi_x(n)$: optical phase acquired at x position on the positive plane.
$\Phi_{-x}(n)$: optical phase acquired at x position on the negative plane.
$\Phi_{disp}$: optical dispersion phase.
$\Phi_{KL}(n)$: dispersion-free k spectrum after k-linearization process.
$X_d(n)$: phase compensation term used to compensate for asymmetry about the zero delay line. e.
$z_d$: PSF peak position alter FFT, where d is Px and −Px.
$s_0$: corrected fringe after k-linearization.
$s_1$: corrected fringe after KL and DC processes.
$s_2$: corrected fringe after KL, DC and spectral flattening process.
$s_3$: corrected fringe after KL, DC and spectral flattening process without using analytical form to reduce computational cost.

At block 305, mirror measurements can be obtained. A mirror measurement is a signal which is generated from OCT system 100 when a mirror is placed at the sample 140. The resulting measurement is a time varying amplitude from the interferogram acquired by the A/D card. At this block, OCT signals, which can include raw fringe data, can be obtained from a mirror or reference reflector in the sample arm of the OCT system from both a negative imaging plane and a positive imaging plane separately. The background spectrum can also be obtained by removing the sample. In some examples, the raw fringes on either side of the mirror arm can be obtained at a pixel depth of 250-300 pixels, equivalent to 25%-30% of Nyquist depth in a 1024 pixel system. In other examples, any two arbitrary positions can be chosen for the pixel depths.

In some examples, measurements can be taken as positions P1 to P3 as illustrated in FIG. 1B. As further explained, the information derived from these measurements. In some examples, measurements from the P1 and −P1 positions can be used to retrieve the phase as the function of the sampling index n, $\Phi_{P1}(n)$ and $\Phi_{-P1}(n)$, accordingly, and used to calculate the spectra KL, and dispersion spectra. The fringe taken at P1 is used to estimate the spectral flattening spectra. In other examples, measurements taken at P1 to P3 are used to optimize the k-spectrum based on the best polynomial fitting order detected from the algorithm. In some examples, the location of P1, P2, and P3 can be chosen based on the desired or estimated depth of a sample to optimize the polynomial fit over the depth range.

Aspects of the acquired signal or signals are illustrated with reference to FIG. 4A. In some examples, a complex signal and phase of that signal can be calculated by a Hilbert transform from the acquired measurements at positions P1 to P3.

A k-linear phase can also be calculated by averaging the fringe to obtain the clean optical phase $\Phi_{P1}(n)$ and $\Phi_{-P1}(n)$ from the P1 and P2 positions. Interferograms of P1 to P3 are used to perform to optimize the interpolation performance of KL spectrum and reduce or avoid noise effects from deeper depths of the OCT signal.

Stated alternatively, as it is known that $I_{P1}(n) \propto \cos\{k(n)z_{P1} + \Phi_{disp}(n)\}$ and that $L_{P1}(n) \propto \cos\{k(n)z_{P1} - \Phi_{disp}(n)\}$, the instantaneous optical phase $\Phi_{P1}(n)$ and $\Phi_{-P1}(n)$ can be calculated by Hilbert transform to obtain $\Phi_{P1}(n) = k(n)z_{P1} + \Phi_{disp}(n)$ and $\Phi_{-P1}(n) = k(n)z_{P1} - \Phi_{disp}(n)$. At this block, the background can be removed from the signals obtained at block 305.

At block 310, the dispersion-free k spectrum (k-spectrum), $\Phi_{KL}(n)$, can be calculated based on the relationship $\Phi_{KL}(n) = 0.5 * \{\Phi_{P1}(n) + \Phi_{-P1}(n)\}$. Aspects of this block are further explained with reference to FIG. 4B (1) where the solid line represents the dispersion-free k-spectrum and the dash line shows the ideal linearized k-spectrum. The difference between the curves represents the nonlinearity of the k-clocks that needs to be corrected in the next section. Both curves are used to interpolate the raw fringe on the wavenumber phase domain directly to obtain KL corrected fringe $s_0(n)$. In addition, to test the algorithm with an uncalibrated OPTIS system, OCT signal was acquired at the 500 MHz internal sampling rate of an A/D card instead of using k-clocks. FIG. 4B (2) shows effective calibration that corrects the nonlinear k-spectrum to a linearized k-spectrum after KL process. The calibrated results are accordingly shown in FIG. 12. Previous techniques perform the interpolation in the time domain but performing the interpolation in the time domain requires an additional polynomial fitting to project the k-domain phase back to time domain (N=1-2048) and the precision is extremely sensitive to the polynomial fitting order. To save the computational cost from an additional polynomial fit to remap interpolation from k-domain back to time-domain, aspects of this method can be selected to run k-spectrum interpolation directly in the wavenumber domain.

Figure 4A:
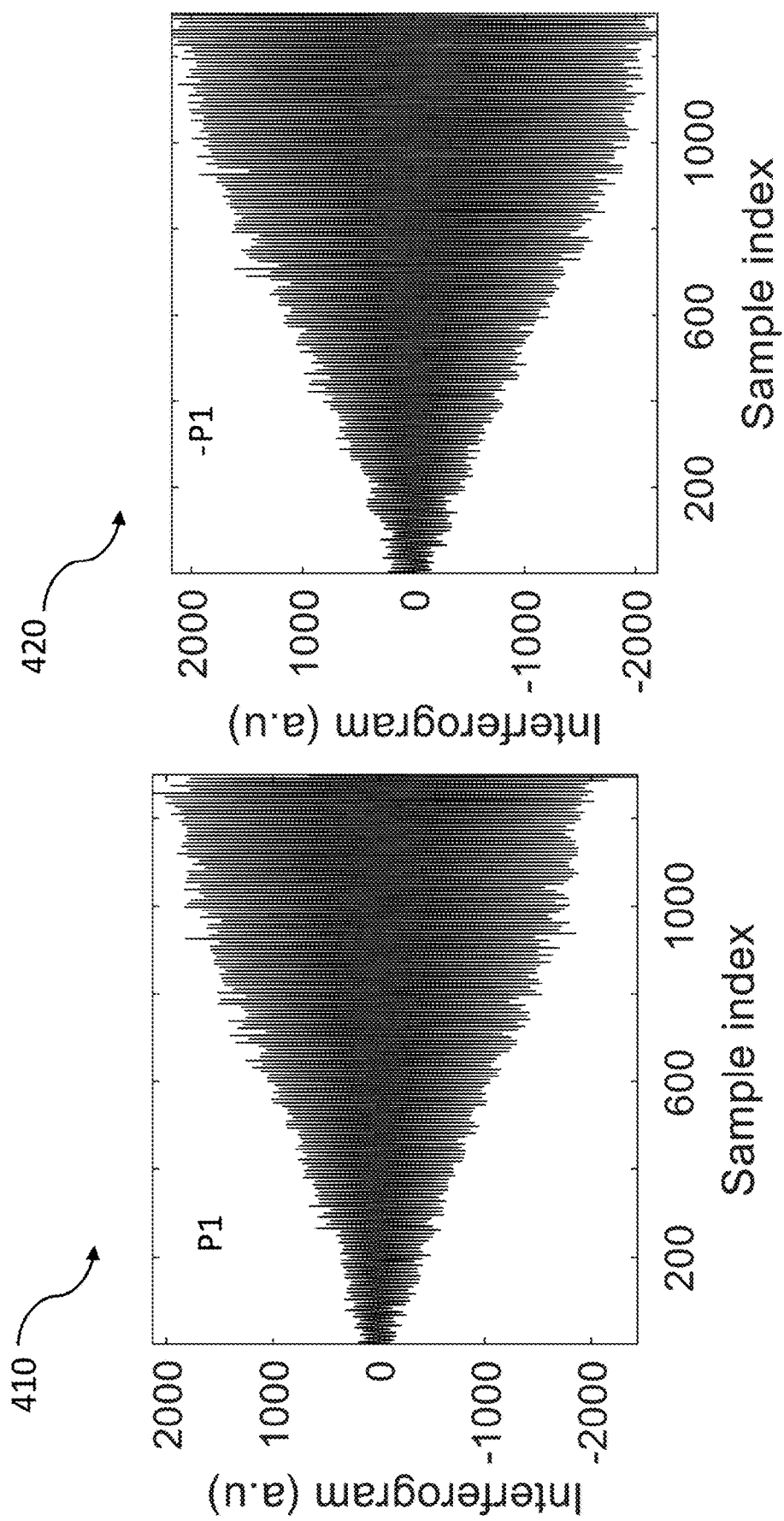
FIG. 4A illustrates aspects of obtained interferogram in accordance with aspects of the disclosure.
Figure 4B:
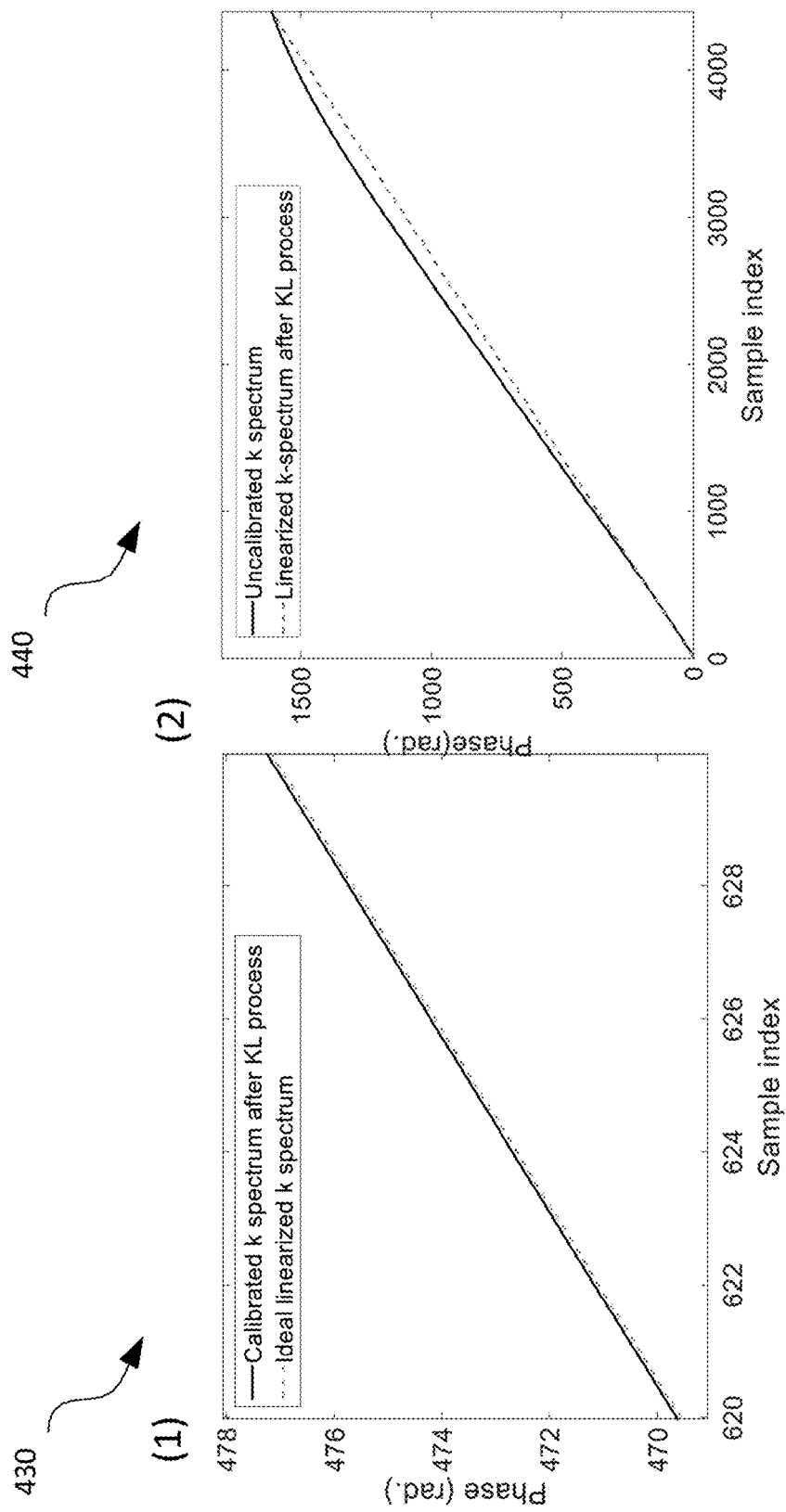
FIG. 4B illustrates aspects of the nonlinear effects due to system dispersion based on the curves of calibrated k-spectrum by KL process and ideal linearized k spectrum.
Figure 4C:
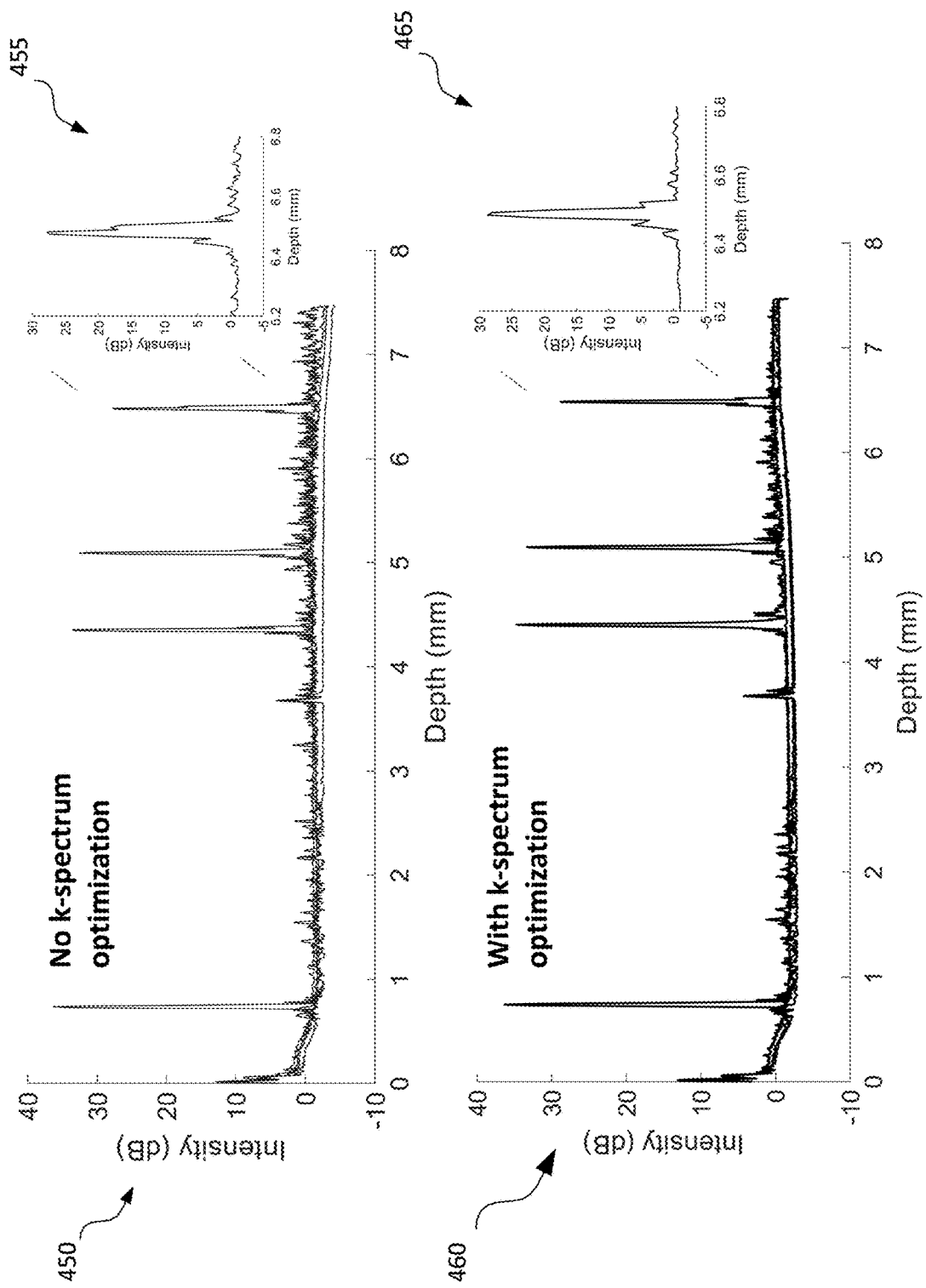
FIG. 4C illustrates aspects of intensity at various imaging depths with and without k-spectrum optimization in accordance with aspects of the disclosure.

In some examples, with the reference to FIG. 4C, system noise across the fringe, and the increasing sampling error close to the Nyquist depth can easily cause imaging sidelobe artifacts and further deteriorate the system resolution at deeper depths (i.e. deeper depths of signals has less sampling points per fringe cycles). Therefore, the dispersion-free k spectrum is necessary to be optimized with a polynomial fitting function, and the polynomial fitting order can be optimized. Results is referenced to FIG. 4C with zoom-in windows 455 and 465, show the improve PSF without sidelobes artifacts.

At block 315, any or all of the following steps can be used as part of the polynomial optimization process to find the best polynomial order for the KL spectrum:

The KL spectrum, $\Phi_{KL}(n)$, can be acquired with polynomial fitting at P1 or any of the other mirror(P2, P3, etc.) positions, A KL resampling with varying polynomial fitting orders can be applied for the signal acquired at other positions such as P2, and P3. In some examples, a polynomial from an order of 0 to 50 can be used, where 0 represent the raw k-spectrum without applying fitting.

The full width at half maximum (FWHM) (referred to as a1 in this block) and the point spread function (PSF) area total (referred to as a2 in this block) are calculated based on the PSF profiles after the k-spectrum interpolation by each fitting order.

The a1 and a2 parameters can be calculated for each depth position P1, P2, and P3 in every polynomial order. Afterward, the parameter a1 and a2 are averaged along depths and then normalized to 0-1 separately.

The polynomial order with a minimum (a1+a2) can be found.

The polynomial order causing the sharpest intensity peak in the preceding step can be saved as the optimized fitting order for the saved k-spectrum and used across the entire KL process at all other depths and for all other OCT signals in real-time imaging stage. Exemplary improvement of imaging artifacts is referenced to the bottom row in FIG. 4C and FIG. 11.

At block 320, the dispersion spectrum can be calculated. First, the raw fringe is interpolated using the k-spectrum from block 310. The interferogram with the mirror at position P1 and −P1 is described by the following relationship $I_{P1}(n) \propto \cos\{k(n)z_{P1} + \Phi_{disp}(n)\}$ and $L_{-P1}(n) \propto \cos\{k(n)z_{P1} - \Phi_{disp}(n)\}$. When the mirror positions are not equidistant to the zero-delay line the dispersion phase, $\Phi_{disp}$, can be achieved as following:

$$\Phi_{disp}(n) = 0.5 * \{(\Phi_{P1}(n) + n*X_{P1}) - (\Phi_{-P1}(n) + n*X_{(-P1)})\},$$
$$\text{and } X_d = z_d + 0.5 * \{z_{(P1)} + z_{(-P1)}\}.$$

Figure 4D:
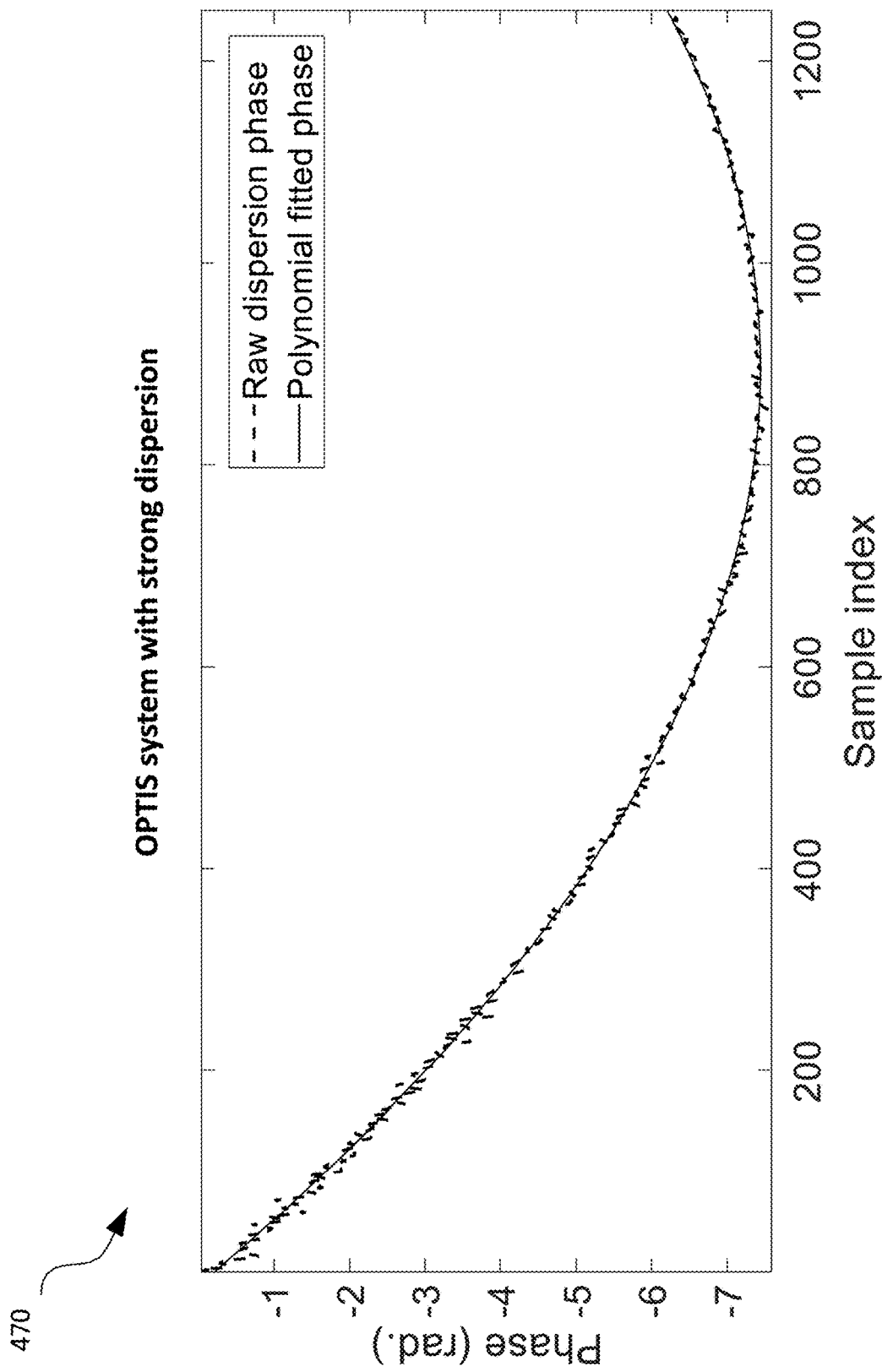
FIG. 4D illustrates aspects of a raw dispersion phase and a polynomial fit of the dispersion phase in accordance with aspects of the disclosure.

For each calibration pair of mirrors, the term $X_d$ is used to compensate the phase difference of the calibration mirrors due to their unequal positions relative to the zero-delay line. The noise $\Phi_{disp}(n)$ can be removed by fitting a polynomial function or simply filtered by a low pass filter, as illustrated in FIG. 4D. The $\Phi_{disp}(k)$ function obtained can be saved for use as a counter-dispersive phase to subtract with the analytical form of the KL corrected fringe $s_0(n)$. Example results of the fringe data and the OCT intensity shape after applying the dispersion correction is referenced to FIG. 6B.

At block 325, calculate spectral flattening (SF) spectrum, SF(n) can be calculated by the envelope value of the KLDC corrected fringe, $s_1(n)$. In some examples, spectral flattening can further increase the performance of the axial resolution by increasing the available bandwidth as shown in FIG. 6C. In one example a SF window can be calculated as a calibration step and applied to future data using a window function (i.e. Kaiser-Bessel window) to form a demodulation window, e.g.

$$s_2(n) = s_1(n) \times \frac{\text{kaiser window}}{SF(n)}.$$

In one example, the envelope used can be derived from the signal obtained from the any of reference mirror positions from block 305.

In one example, the first step of the spectral flattening process is to calculate the envelope of the fringe by taking the absolute value of the KLDC-corrected fringe after a Hilbert transform has been applied to it. This step can occur when a mirror is placed in the sample arm. Upon calculation of the spectral envelope, the spectral envelope can be fit by a polynomial function, see FIG. 4E for an example.

At block 330, the various spectra calculated in steps 310-325 can be saved. At this block, the various spectra can be stored or moved to various parts of computing device 200.

FIG. 4A illustrates various aspects of an obtained input signal. Graph 410 illustrates an input signal obtained from a positive imaging plane. Graph 420 illustrates an input signal obtained from a negative imaging plane. Graph 410 and graph 420 can also be described as an example of a k-clock sampled interferogram (raw fringe) from an OCT system. Although graph 410 and graph 420 represent empirically obtained data, the intensity of the fringe signal in the graphs can be described by the wavenumber 'k' and dispersion with the following relationship: $I_{P1}(n) \propto \cos\{k(n)z_{P1}+\Phi_{disp}(n)\}$ and $I_{-P1}(n) \propto \cos\{k(n)z_{-P1}-\Phi_{disp}(n)\}$. Dispersion can be measured in radians or any other angular measure and represents an optical phase that determines the amplitude modulation of the sinusoidal signal.

With reference to FIG. 4B, graphs 430 (FIG. 4B (1)) and graph 440 (FIG. 4B (2)) are illustrated. FIG. 4B (1) illustrates, graph 430, the dispersion free k-spectrum compared to an ideal linearized k-spectrum. FIG. 4B (2) illustrates graph 440 shows effective correction on uncalibrated k-spectrum after KL process. In FIG. 4B, a dashed line can be the optical phase calculated after k-linearization process.

FIG. 4C illustrates graphs 450 and 460. Graph 450 illustrates intensity without k-spectrum optimization. Graph 455 highlights one peak showing the uneven sidelobes. Graph 460 illustrates the same signal with k-spectrum optimization. Graph 465 highlights the same peak as 455 showing the sidelobes are suppressed and the graph is symmetrical after k-spectrum optimization.

FIG. 4D illustrates graph 470, illustrating a graph of raw dispersion data with a polynomial fit $\Phi_{disp}(n)$ saved therein.

Figure 4E:
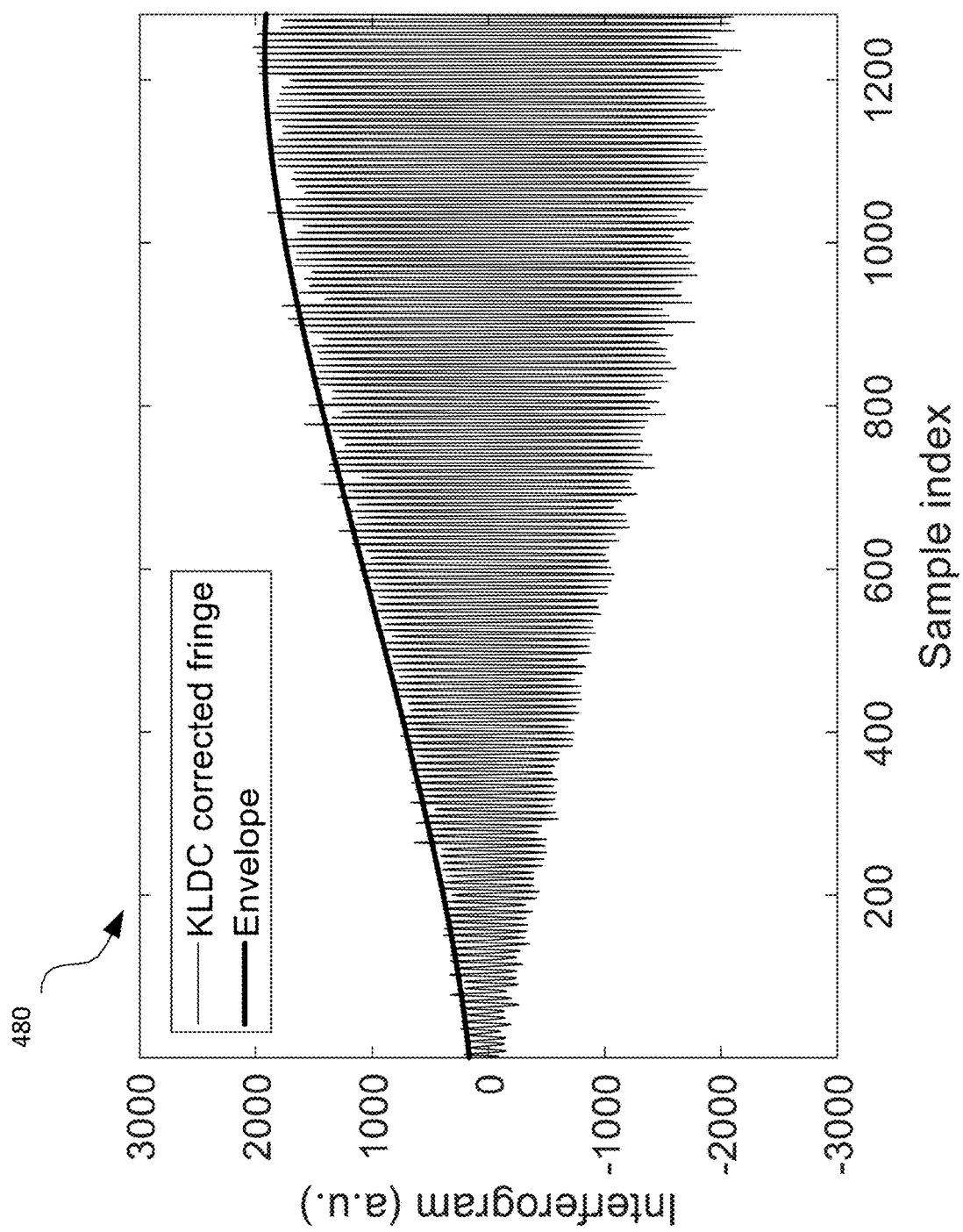
FIG. 4E illustrates a KLDC corrected fringe and an envelope calculated for the corrected fringe in accordance with aspects of the disclosure.

FIG. 4E illustrates graph 480. Graph 480 illustrates example data of KLDC corrected fringe and its calculated envelope with polynomial fit. The calculated envelope can be saved for later use.

Figure 5:
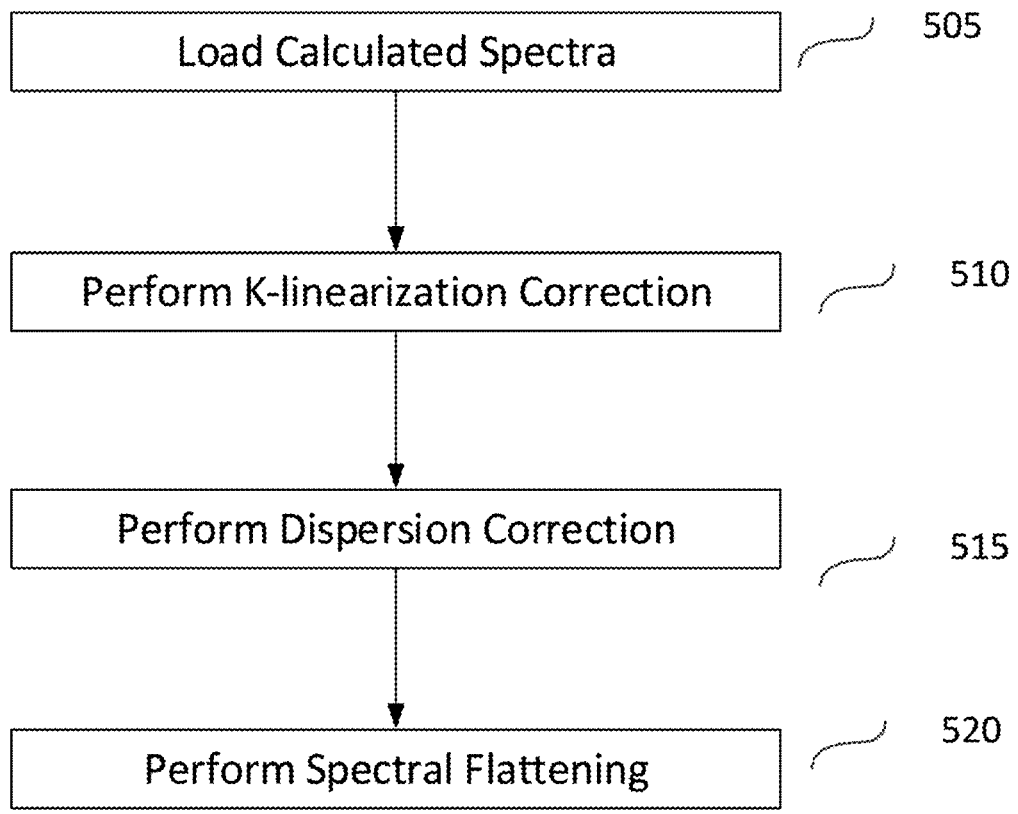
FIG. 5 shows a flow diagram of a method in accordance with aspects of the disclosure.

FIG. 5 illustrates a method 500 for performing real-time OCT imaging performed by graphic processing unit (GPU) or a field programmable gate array (FPGA) according to aspects of this disclosure. Method 500 can also be performed in part or entirely by other computing devices, such as for example, device 200. Method 500 can be performed in real-time during the operation of an OCT system using the data obtained in earlier parts.

At block 505, one or more spectrum can be loaded or obtained. For example, one or more of the spectra calculated with reference to method 300 can be loaded from memory, such as a k-spectrum, a dispersion spectrum, and a spectral flattening spectrum. At this block, background data of each fringe need to be removed either by a high-pass filter or taken the data by blocking the sample arm.

At block 510, a k-linearization (KL) correction can be performed on collected raw fringe data. At this block, the fringe data can be interpolated by the saved k-spectrum with the optimized polynomial fitting order. In some examples, block 510 can use the k-spectrum data, such as that saved with reference to method 300 and illustrated with reference to FIG. 4B. At this step, the loaded k-spectrum can be used to correct the raw fringe data obtained by performing a cubic spline interpolation in wavenumber space (k-space) on the collected raw fringe data. Performing a cubic spline interpolation in the wavenumber space allows for scaling the raw fringe from a nonlinear into a linear wavenumber domain prior to performing a FFT process. Spline interpolation is a form of piecewise polynomial interpolation to avoid overfitting problem causing spike errors. In some examples, FPGAs or GPU can be used to efficiently perform the cubic spline interpolation in the wavenumber domain, allowing the KL correction to be performed in real-time, such as during the operation of an OCT system. The raw fringe data and the KLDC corrected fringe data are illustrated with respect to FIG. 6B. The spectra can be also loaded into nonuniform FFT without involving numerical interpolation process.

At block 515, dispersion correction (DC) can be performed on the KL corrected fringe data produced at block 510 through the use of the $\Phi_{disp}(n)$ function calculated with reference to method 300, and more specifically, with reference to block 320. At this block, dispersion compensation is performed to cancel out the dispersion phase, and thus correct the OCT signal being obtained. As the polynomial fitted function or low pass filter is being used, a more robust correction can be performed as compared to the raw dispersion data.

At this block, the fringe data can be Hilbert transformed to be an analytical form, and the dispersion phase can be compensated using an exponential function of $-j\Phi_{disp}(n)$, where j is an imaginary unit.

At this block, the new fringe function can be calculated by taking the real part of the corrected fringe data multiplied by the complex-valued phase:

$$s_1(n) = \text{Real}\{\text{analytical form of } s_0(n) \times \exp[-j\Phi_{disp}(n)]\}$$

The real function referred to above takes the "real" portion of the fringe which has been k-linearized and transformed to the complex-valued analytical form.

At block 520, spectral flattening can be performed on the results obtained at block 515. At this block, the spectral envelope can be removed. Despite both KL and DC correction, the ramping envelope of the fringe, shown in FIG. 4E, can still restrict the performance of the axial resolution due to a constrained bandwidth. At this block, the real-valued envelope calculated at block 320 can be used. The spectral envelope from the calibration is incorporated with a window function (e.g. Kaiser window) and is used as a demodulation window to flatten the KLDC corrected fringe.

In some examples, at block 520, the following steps can be performed:

$$s_2(n) = s_1(n) \times \frac{\text{kaiser window}(n)}{SF(n)}$$

The spectral envelope SF(n) above is defined as the envelope of $s_1(n)$.

FIG. 4B illustrates graph 430, which show a generated k-spectrum and an ideal k-spectrum. Graph 620 is an enlarged portion of the original fringe versus KL corrected fringe according to aspects of method 300. The fitted spectrum can be saved and used for real-time imaging as discussed in method 500. Graph 620 illustrates the original data and the corrected data after the step of k-linearization correction is performed.

Figure 6A:
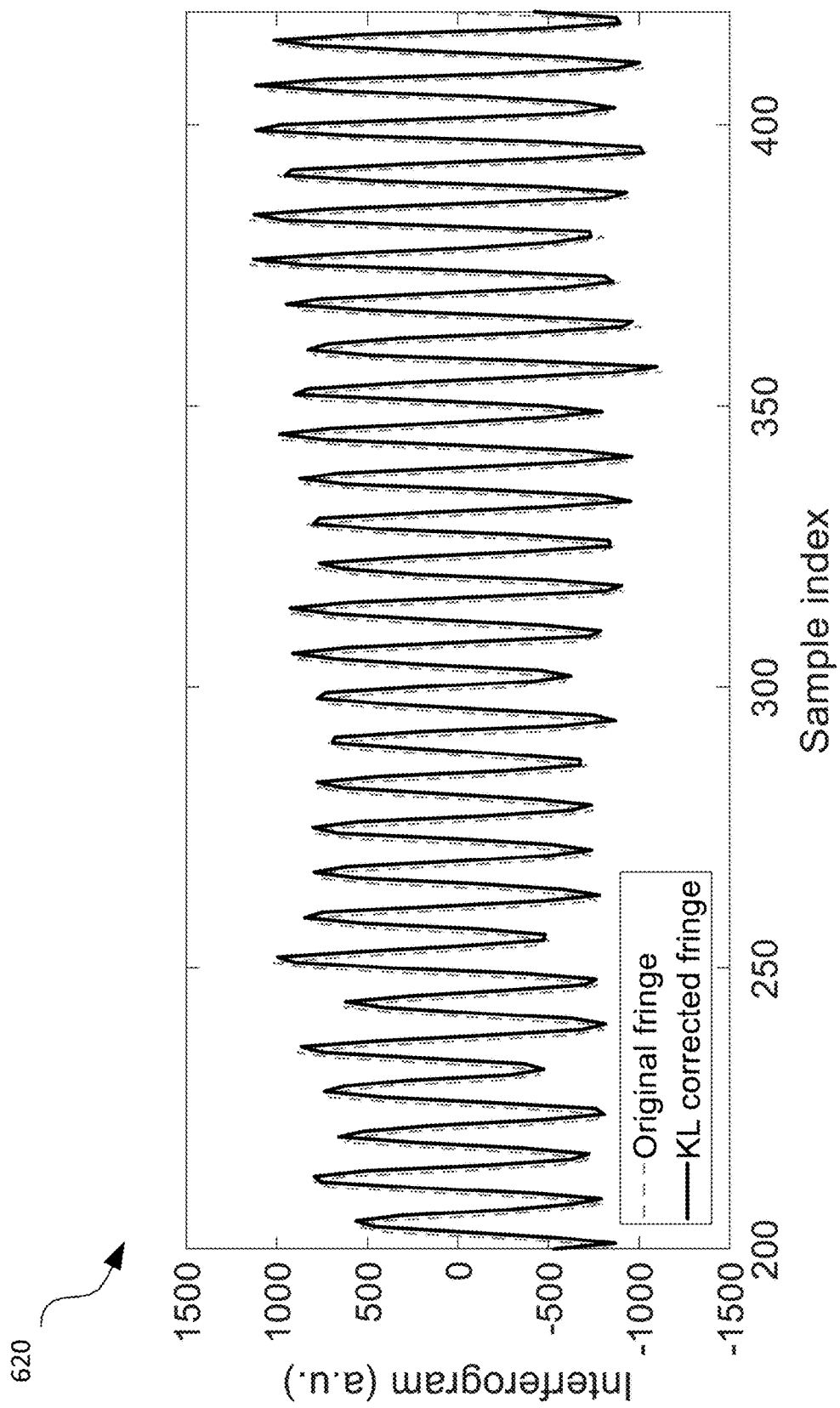
FIG. 6A shows a raw and a k-linearized optical signal in accordance with aspects of the disclosure.

FIG. 6A illustrates graph 620, an interferogram as a function of the sampling index. Illustrated on graph 620 is the original fringe signal and the KL corrected fringe signal.

Figure 6B:
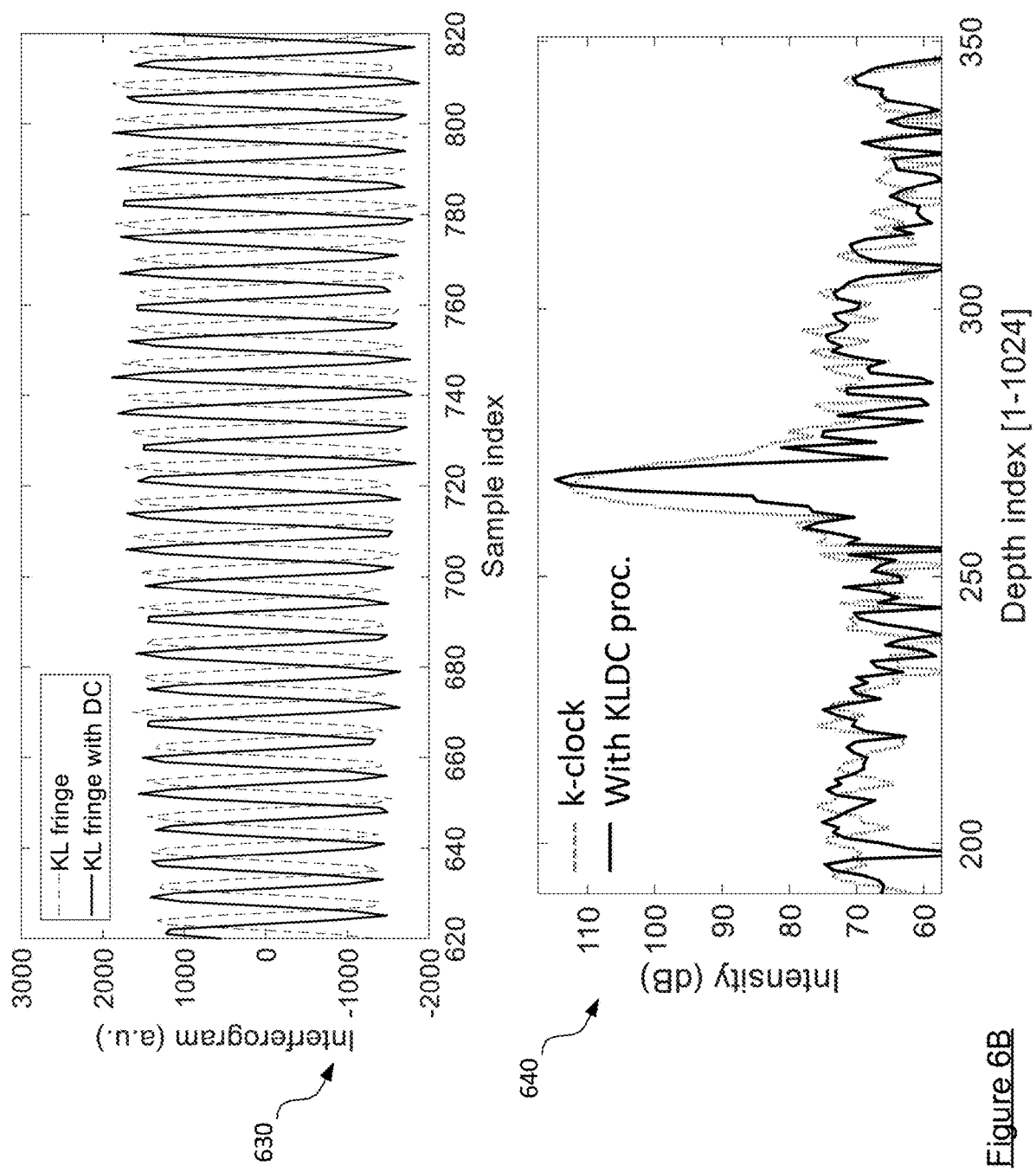
FIG. 6B illustrates a magnified view of the interferogram and the corresponding intensity resulting from a mirror reflection in the sample arm in accordance with aspects of the disclosure.
Figure 6C:
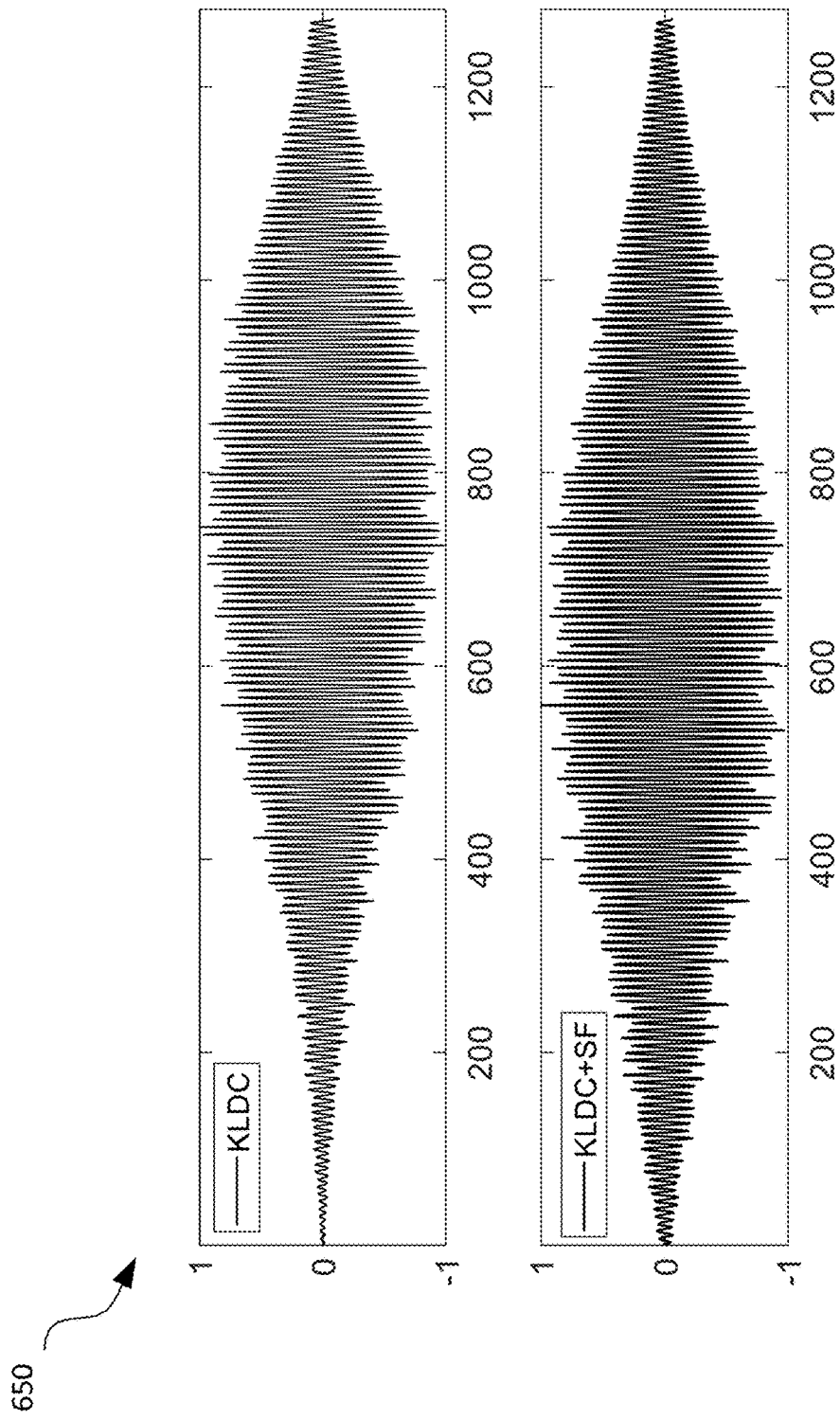
FIG. 6C shows the raw fringe and before and after spectral flattening in accordance with aspects of the disclosure.

FIG. 6B illustrates graph 630 with the difference of the KL corrected fringe signal before and after applying the dispersion correction. The simplified form to accelerate real-time imaging process can be written as:

$$s_3(z) = \text{abs}\left\{s_0(n) \times \exp[-j\Phi_{disp}(n)] \times \frac{\text{kaiser window}(n)}{SF(n)}\right\}$$

The absolute function, abs, referred to above takes the "magnitude or modulus" portion of the fringe which has been k-linearized multiplied with dispersion phase.

The graph 640 shows narrower PSF after KLDC processing versus the k-clock linearization.

FIG. 6C illustrates an example of the difference in bandwidth before and after application of spectral flattening within graph 650. Note the bottom plot has wider FWHM bandwidth and more symmetric structure after spectral flattening.

Figure 6D:
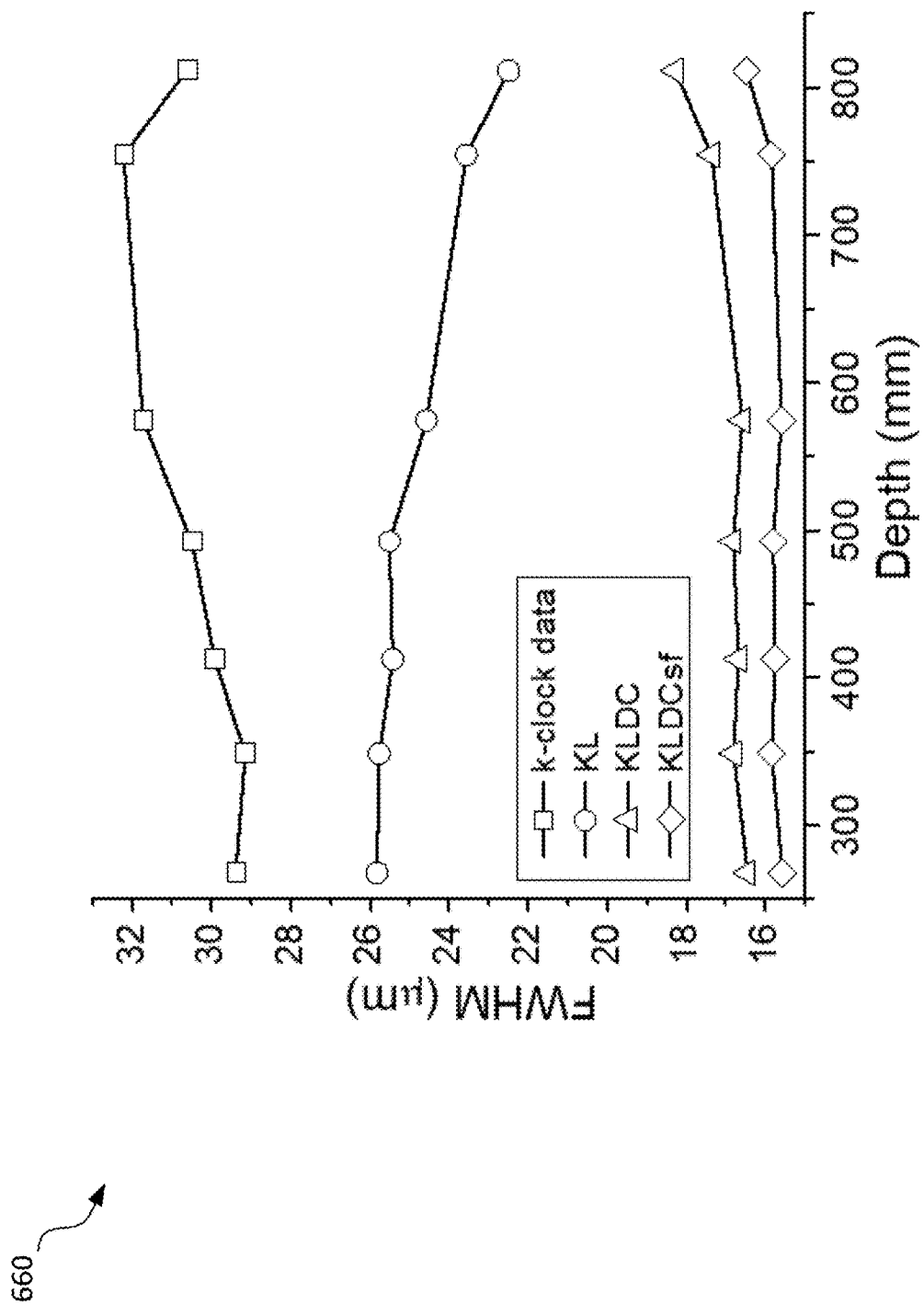
FIG. 6D illustrates various aspects of full-width half maximum (FWHM) plotted against various depths for k-clock data, KL data, KLDC data, and KLDCsf data in accordance with aspects of the disclosure.

FIG. 6D illustrates an example graph 660 illustrating FWHM at different imaging depths using different methods. The data was acquired from an OPTIS OCT system without an k-delay that has not been optimized and strong system dispersion. Graph 660 illustrates that the improvement in the FWHM across all imaging depths between (i) a signal only using k-clock data, (ii) using only KL techniques, (iii) using KL and DC techniques, and (iv) using KL, DC, and SF techniques. The smaller FWHM indicates an improvement in the axial resolution in an OCT image.

Figure 7:
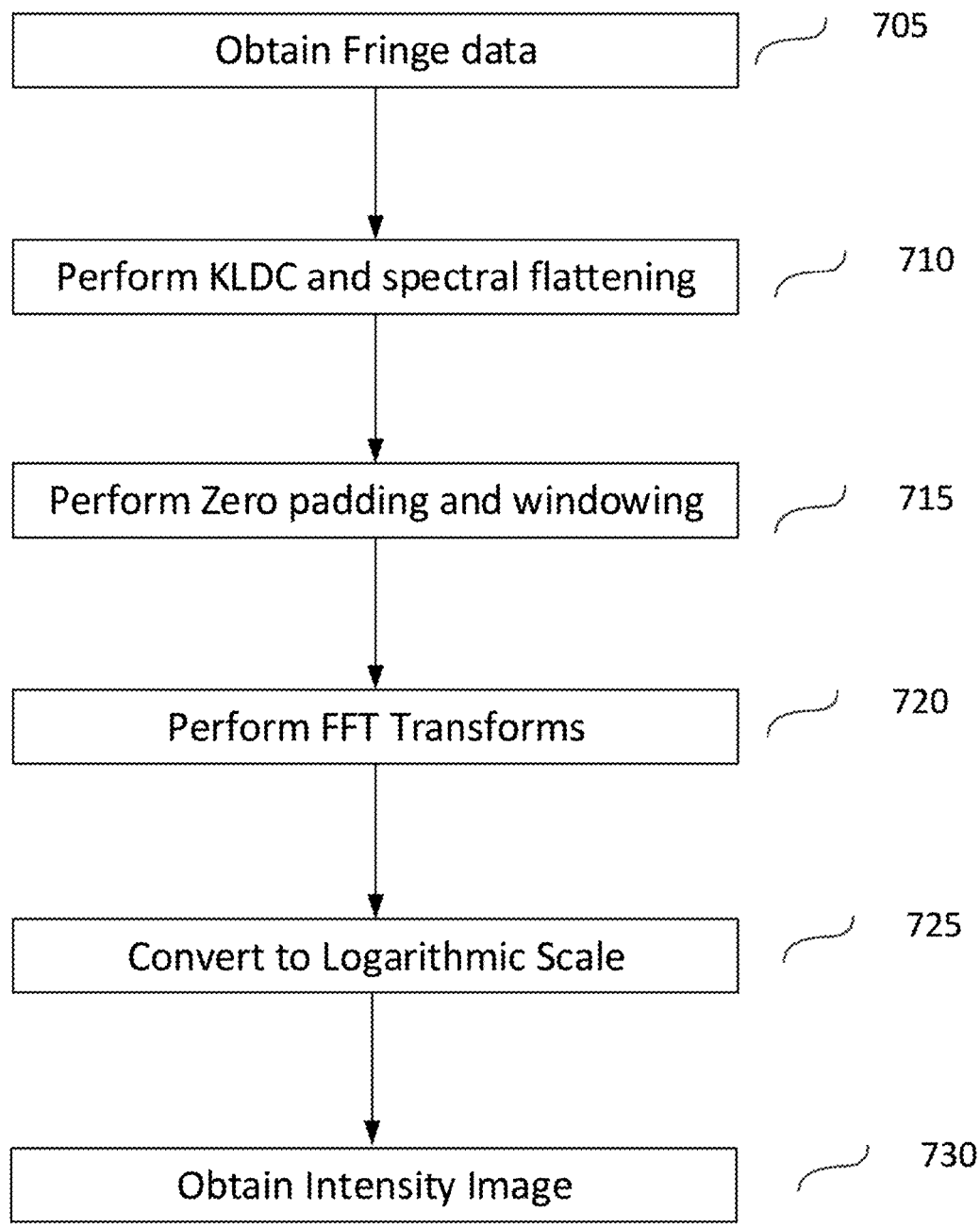
FIG. 7 shows a method to obtain an intensity image in accordance with aspects of the disclosure.

FIG. 7 illustrates method 700 to generate OCT real-time imaging incorporating aspects of KLDC according to aspects of this disclosure.

At block 705, fringe data can be obtained from a sensor of the OCT system. As one example, the system described with reference to FIG. 1 can be used. Another example, an OPTIS system by Abbott can be used.

At block 710, KL, DC, and spectral flattening can be performed. At this step, one or more steps with reference to method 500 can be performed.

At block 715, zero padding and windowing can occur. Windowing is keeping a part of the signal within a chosen interval. Mathematically, windowing is equivalent to applying a window function with a value of zero outside of a chosen interval. Zero padding is a process in which zeros can be added to the end of a signal to extend the length of the signal. This process can also allow the signal obtained to be more efficiently processed by a Fast Fourier Transform. Zero padding can increase the sample points allowing the reconstructed signal to approach the theoretical limit of the optical resolution.

At block 720, Fast Fourier Transforms (FFTs) can be performed on the data obtained. FFT can be an algorithm which calculates a discrete Fourier transform or its inverse.

At block 725 the data is converted to a logarithmic (log) scale. In some examples, the FFT data can be normalized prior to conversion to the log scale.

At block 730, an intensity image can be produced. The produced intensity image can be displayed on a monitor. Image data can be based on the log scale values obtained in block 725.

Figure 8:
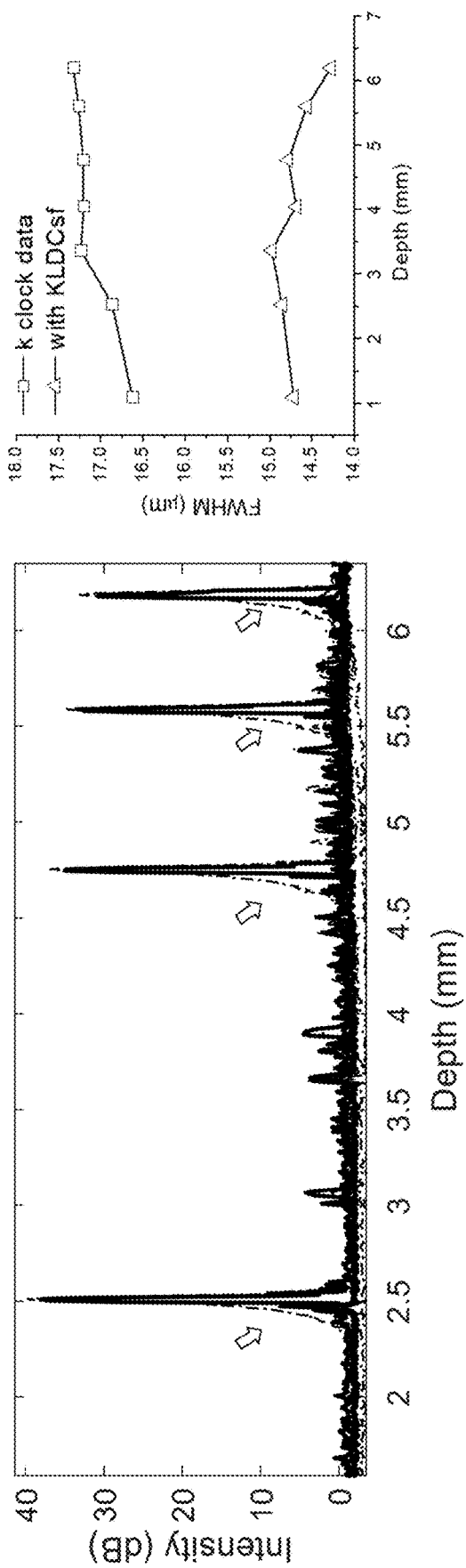
FIG. 8 shows an example of improvement in the width of the point spread function (PSF) and resolution chart according to aspects of this disclosure.

FIG. 8 represents an example OPTIS system with k-delay adjustment set by the standard manufacturing procedure. The plots show the KLDCsf (KLDC and spectral flattening) process corrects imaging sidelobes and improves system resolution in a commercial system that meets specification.

Figure 9:
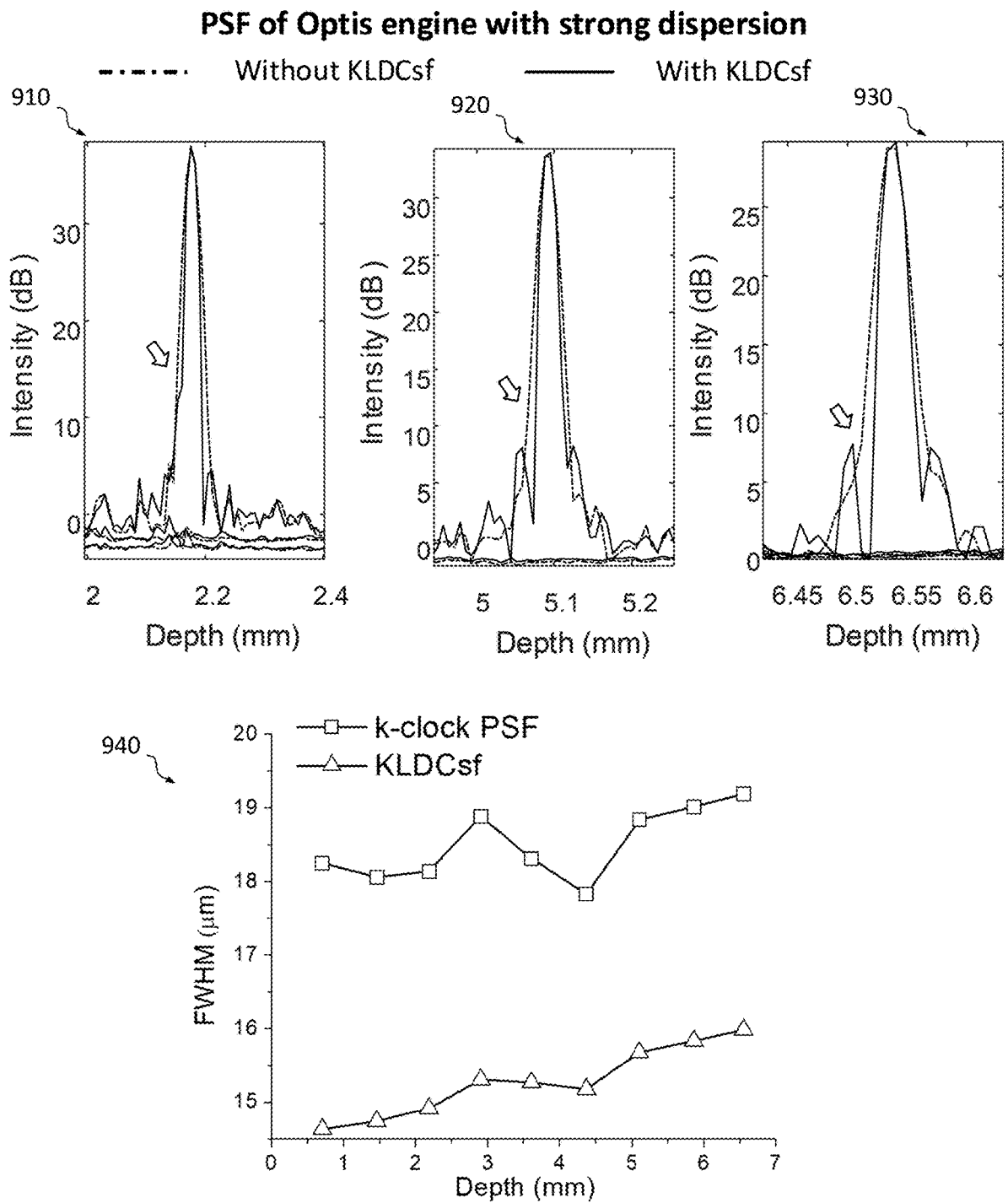
FIG. 9 illustrates aspects of a PSF with strong dispersion at various imaging depths with and without KLDCsf techniques in accordance with aspects of the disclosure.

FIG. 9 illustrates the KLDCsf performance on an OPTIS system with k-delay adjustment within specification. The PSF profiles shows sharper beam waist and the system FWHM shows superior system resolution across the imaging depth. FIG. 9 illustrates intensity plots 910, 920, and 930, at various imaging depths, and the intensity of a signal obtained using KLDCsf techniques and the intensity of the same signal without the use of KLDCsf techniques.

FIG. 9 also illustrates plot 940. Plot 940 illustrates an imaging depth on the x-axis and the FWMH in micrometers on the y-axis. As illustrated in plot 940, the FWMH is consistently narrower across the imaging depth when using the KLDCsf techniques as compared to a system using a k-clock.

Figure 10:
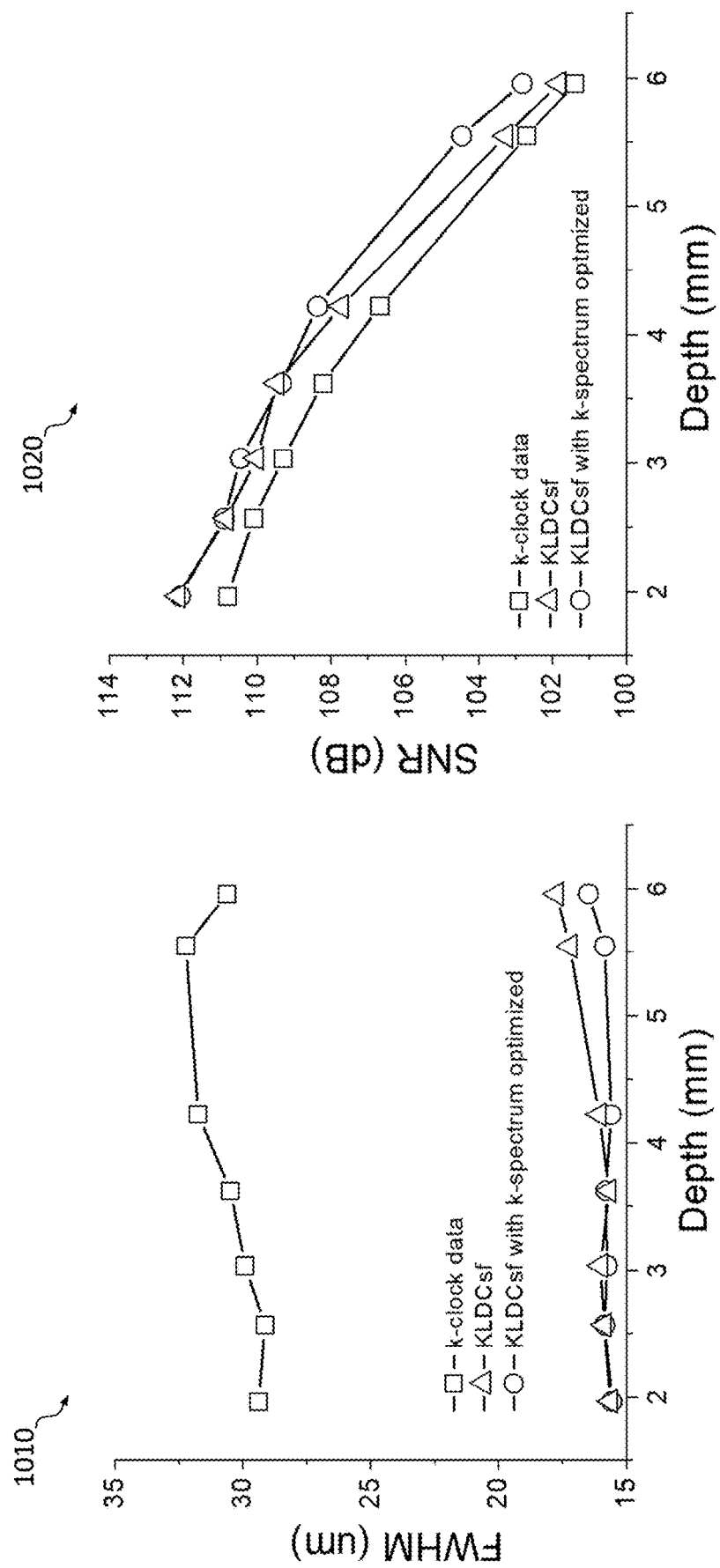
FIG. 10 illustrates aspects of FWHM and signal to noise ratio without k delay adjustment and strong dispersion with k-clock data, KLDCsf data, and KLDCsf data with optimized k-spectrum in accordance with aspects of the disclosure.

FIG. 10 illustrates plots 1010 and 1020 related to the performance of KLDCsf on an OPTIS system without k-delay adjustment and strong dispersion (not within specification). Plots 1010 and 1020 also demonstrate the best resolution and SNR by running KLDCsf with optimized k-spectrum. Plot 1010 illustrates an imaging depth on the x-axis and the FWHM in micrometers on the y-axis. Plot 1010 illustrates a smaller FWHM with KLDCsf process and a minor FWHM improvement when the KLDCsf process is applied to data that has been resampled using a k-clock. Plot 1020 illustrates a signal to noise ratio (SNR) on the y-axis and imaging depth on the x-axis showing a higher signal to noise ratio with KLDCsf techniques as compared to a signal obtained from using a k-clock.

Figure 11:
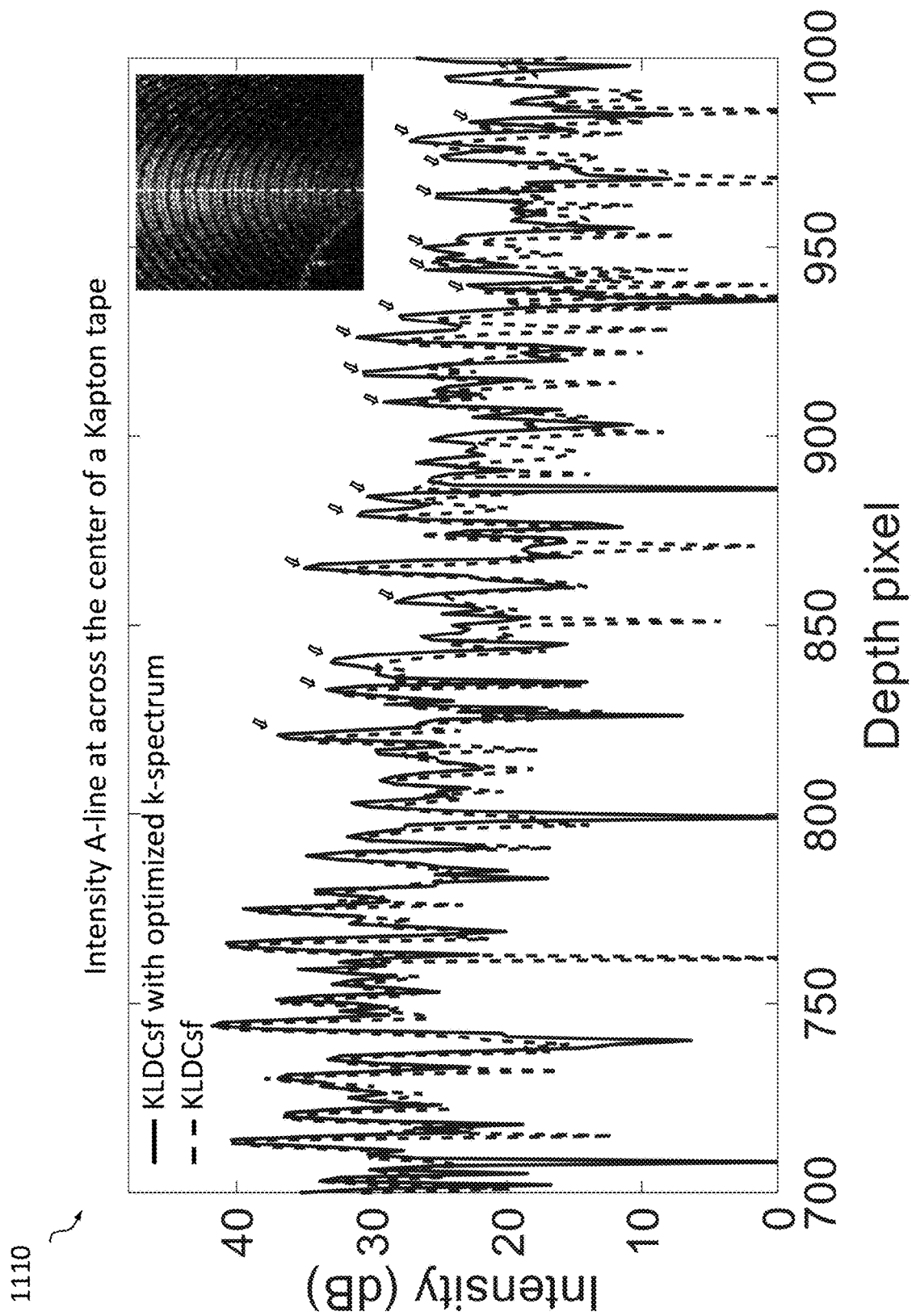
FIG. 11 illustrates aspects of an intensity a-line using KLDCsf with and without an optimized k-spectrum in accordance with aspects of the disclosure. An "A-line" or "axial line" corresponds to one wavelength sweep of a laser which in turn corresponds to a one-dimensional line scan.

FIG. 11 illustrates graph 1110 of a single line scan (A-line) imaged from a Kapton tape roll by an OPTIS system operating within specification. The KLDCsf was applied on raw data and data that has been linearized in k-space using a k-clock. Graph 1110 illustrates pixel depth on the x-axis and intensity in decibels on the y-axis. As can be seen from the unlabeled arrows indicating peaks, the intensity peaks obtained using KLDCsf with an optimized k-spectrum are higher than the intensity peaks by only using KLDCsf at greater depths (≥80% of Nyquist imaging depth) resulting in better SNR and system resolution at depth. There was no obvious difference before 80% of Nyquist depth.

Figure 12:
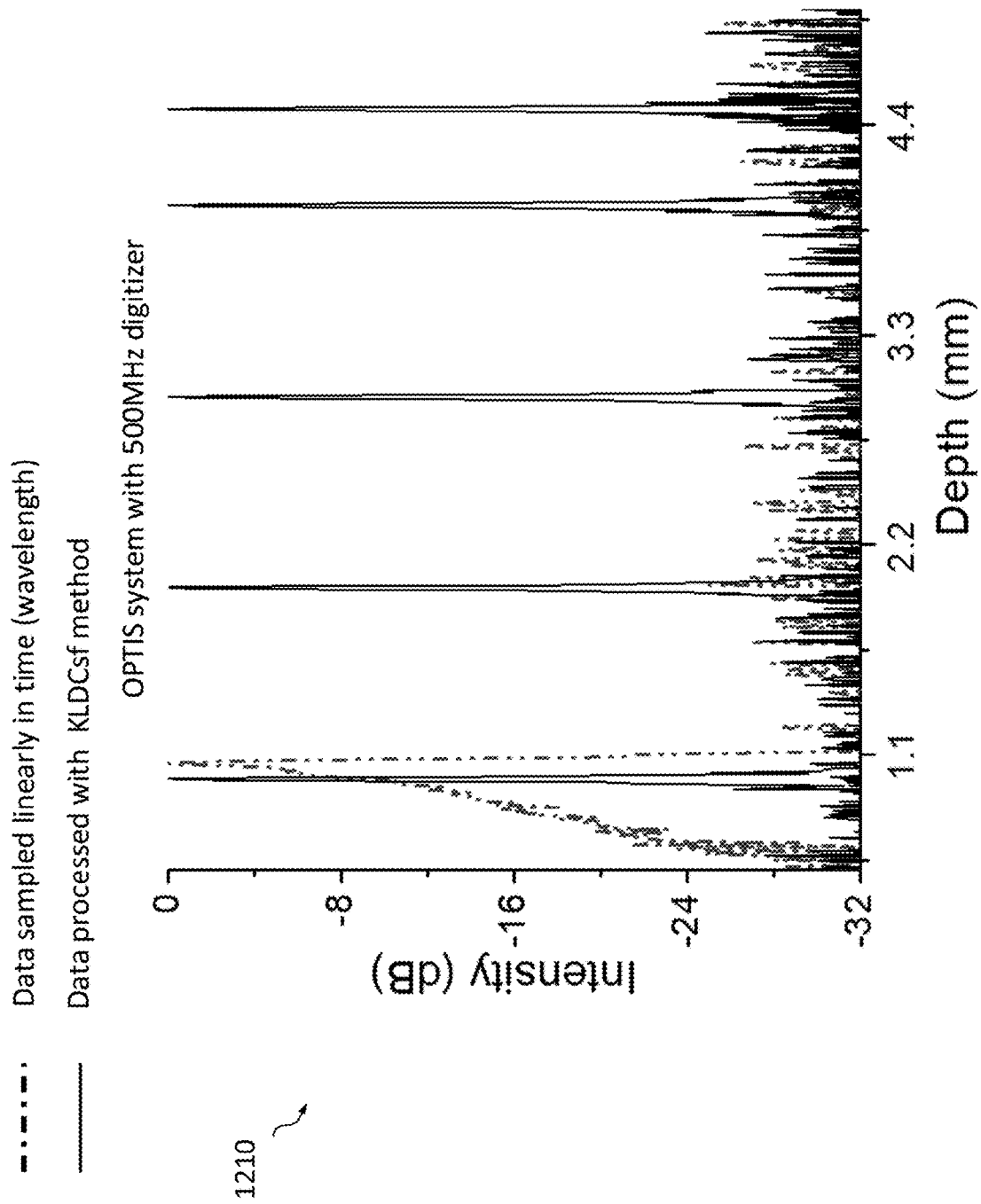
FIG. 12 illustrates aspects of data sampled linearly in time (wavelength) without k-clocks and data processed using KLDCsf methods in accordance with aspects of the disclosure.

FIG. 12 illustrates the performance of KLDCsf applied on the mirror signal of OPTIS system without using k-clocks. As can be seen from graph 1210, KLDCsf processing of a signal leads to sharper and symmetric peaks at sample depths while the mirror signal cannot be reconstructed with the data that has not been linearized in k-space.

Figure 13:
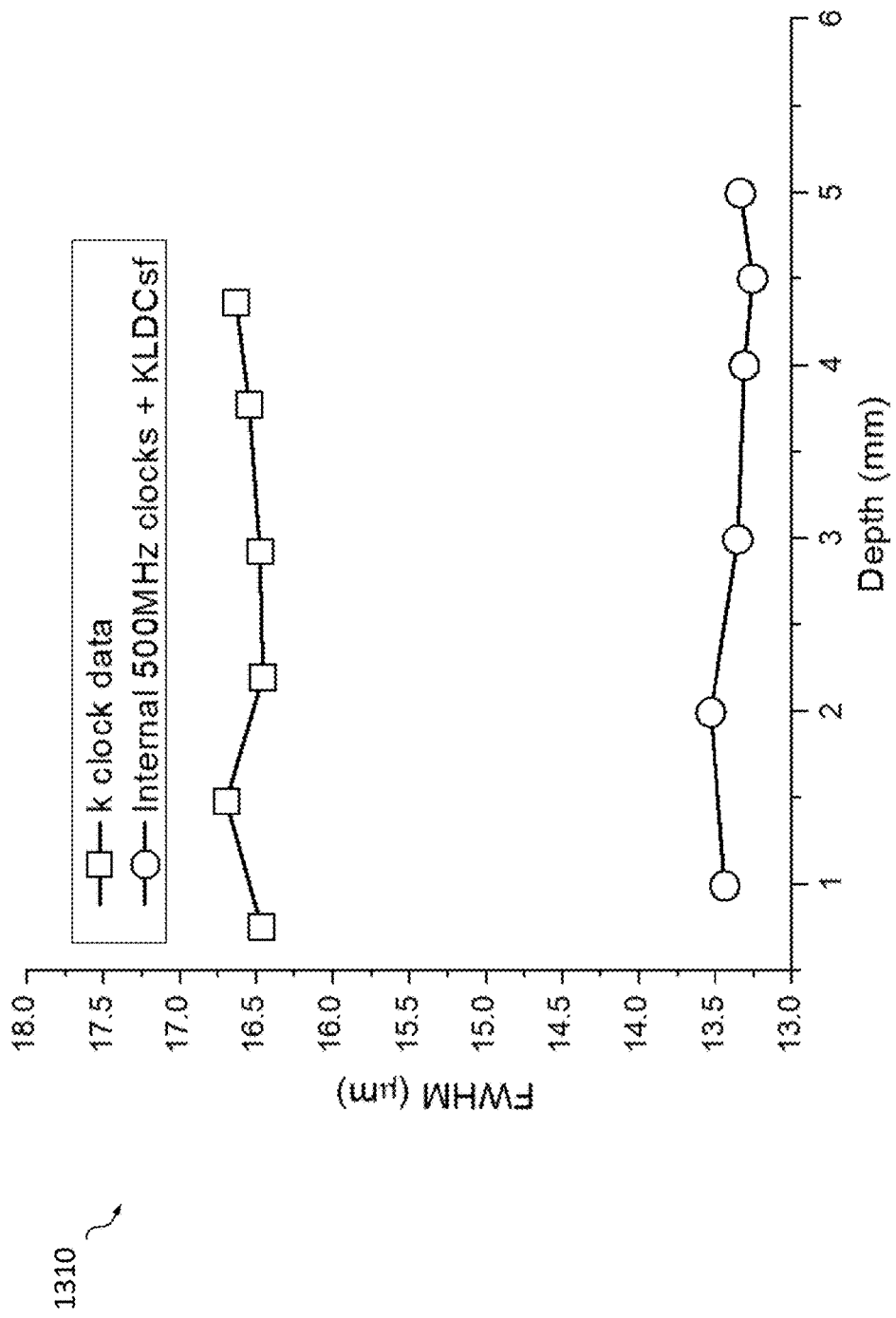
FIG. 13 illustrates aspects of FWHM using data resampled using a k-clock and using A/D card internal sampling with KLDCsf techniques at various imaging depths in accordance with aspects of the disclosure.

FIG. 13 illustrates plot 1310 showing the resolution of a standard OPTIS system using its internal k-clock and the same system without connecting k-clocks where the KLDCsf process is used. As can be seen from 1310, KLDCsf without using the k-clock improves the resolution of the original k-clock configuration.

The aspects, embodiments, features, and examples of the disclosure are to be considered illustrative in all respects and are not intended to limit the disclosure, the scope of which is defined only by the claims. Other examples, modifications, and usages will be apparent to those skilled in the art without departing from the spirit and scope of the claimed disclosure.

The use of headings and sections in the application is not meant to limit the disclosure; each section can apply to any aspect, example, or feature of the disclosure.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" or "substantially" is before a quantitative value, the present teachings also include the specific quantitative value itself, unless specifically stated otherwise. The terms "about" and "substantially" as used herein, refer to variations in a numerical quantity that can occur, for example, through measuring or handling procedures in the real world; through inadvertent error in these procedures; through differences/faults in the manufacture of materials, such as composite tape, through imperfections; as well as variations that would be recognized by one in the skill in the art as being equivalent so long as such variations do not encompass known values practiced by the prior art. Typically, the terms "about" and "substantially" means greater or lesser than the value or range of values stated by $\frac{1}{10}$ of the stated value, e.g., ±10%.

It should be understood that the order of steps or order for performing certain actions is immaterial so long as the present teachings remain operable. Moreover, two or more steps or actions may be conducted simultaneously.

The use of headings and sections in the application is not meant to limit the disclosure; each section can apply to any aspect, example, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

When values or ranges of values are given, each value and the end points of a given range and the values there between may be increased or decreased by 20%, while still staying within the teachings of the disclosure, unless some different range is specifically mentioned.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

It is to be understood that the figures and descriptions of the disclosure have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein. It should be appreciated that the figures are presented for illustrative purposes and not as construction drawings. Omitted details and modifications or alternative examples are within the purview of persons of ordinary skill in the art.

It can be appreciated that, in certain aspects of the disclosure, a single component may be replaced by multiple components, and multiple components may be replaced by a single component, to provide an element or structure or to perform a given function or functions. Except where such substitution would not be operative to practice certain embodiments of the disclosure, such substitution is considered within the scope of the disclosure.

The examples presented herein are intended to illustrate potential and specific implementations of the disclosure. It can be appreciated that the examples are intended primarily for purposes of illustration of the disclosure for those skilled in the art. There may be variations to these diagrams or the operations described herein without departing from the spirit of the disclosure. For instance, in certain cases, method steps or operations may be performed or executed in differing order, or operations may be added, deleted or modified.

Aspects of the disclosed technology can include the following features in any combination:

A method of processing an optical signal to improve resolution of an optically acquired image comprises: calibrating an optical system, the calibration comprising: acquiring, by one or more processors, at least a first mirror measurement and a second mirror measurement, the first and second mirror measurement being collected from either side of a zero-delay line, each mirror measurement being an interferogram or a signal or a system impulse response; obtaining, by the one or more processors, an amplitude and phase for the first mirror measurement and the second mirror measurement; resampling, at least one of the first mirror measurement and the second mirror measurement to be at least one of: (i) in linear wavenumber (k) space or (ii) linear wavelength or (iii) linear time, to generate a resampled mirror measurement; and calculating, using a function, an optimized fit for the resampled mirror measurement. Any number of mirror measurements can be used for the calibration. For example, several, tens, hundreds, or more mirror measurements may be obtained and used for calibration.

The function used to fit may be one of a polynomial function, cubic spline fitting function, radial basis function, or a piece-wise function. The method may further comprise performing k-linearization on the raw interferogram of mirror measurements, the mirror measurements obtained with or without use of a k-clock, and generating a resampled interferogram, wherein the resampled mirror measurement is in k-space.

The k-linearization may be performed using an interpolation function, the interpolation function being one of cubic spline interpolation, cubic interpolation or linear interpolation in k-space.

The method may further comprise performing spectral flattening on at least one mirror measurement by using an envelope calculated from a specific mirror measurement.

Each mirror measurement may be a system impulse response.

The method may further comprise calculating a dispersion compensation for at least two mirror measurements and optionally compensating for the dispersion. It may further comprise saving a spectral envelope calculated during spectral flattening.

According to some examples, an optimized polynomial is determined based on at least two mirror measurements. In some examples more than two mirror measurements may be used. Optimization of the optimized polynomial may be based on a polynomial fitting order 1 to n, where n is a fixed integer. The method may further comprise finding the polynomial fitting order minimizing: (i) the area of the point-spread function, (ii) full-width half max (FWHM) resolution, or a combination of (i) and (ii) for each of the mirror measurements.

The method may further comprise saving calibration criteria related to (i) k-linearization (KL), (ii) dispersion correction (DC), and (iii) spectral flattening (SF).

The method may further comprise receiving an OCT signal or interference signal from a specimen. The method may further comprise generating a new fringe or resampling an interferogram after linear k-interpolation to k-linearize the received OCT signal or interference signal by using the KL calibration criteria. The method may further comprise performing dispersion correction on the k-linearized OCT signal or interference signal using the DC calibration criteria. The method may further comprise removing the envelope of the k-linearized and dispersion corrected OCT signal or interference signal. The method may further comprise converting the OCT signal or interference signal to an OCT image for display on a display.

A method of generating an OCT image from an OCT signal may comprise: obtaining an OCT signal corresponding to a specimen and loading the calibration spectra; wavenumber linearizing (KL) the OCT signal to generate a KL OCT signal; dispersion correcting (DC) the KL OCT signal to generate an KL DC OCT signal; spectral flattening (sf) the KLDC OCT signal to generate a final KLDCsf OCT signal; and performing post-processing on the final OCT signal to generate an OCT image; wherein the calibration spectra used to generate KL OCT signal, KL DC OCT signal, and final KLDCsf OCT signal are based on calibration criteria generated at a calibration stage.

The OCT signal may be, for example, an interferogram.

The calibration criteria may be generated at the calibration stage using at least a first mirror measurement and a second mirror measurement, the first and second mirror measurement being collected from either side of a zero-delay line, each mirror measurement being an interferogram or a signal or a system impulse response. According to some examples, additional mirror measurements may be used.

A system for displaying sets of images of a subject comprises: a memory for storing image data and time-varying data that corresponds to a subject; and one or more processors in communication with the memory, the one or more processors being operable to: acquire, by one or more processors, at least a first mirror measurement and a second mirror measurement, the first and second mirror measurement being collected from either side of a zero-delay line, each mirror measurement being an interferogram or a signal or a system impulse response; compute, by the one or more processors, an amplitude and phase for the first mirror measurement and the second mirror measurement; resample, at least one of the first mirror measurement and the second mirror measurement to be at least one of: (i) in linear wavenumber(k) space, (ii) linear wavelength, and (iii) linear time to generate a resampled mirror measurement; and calculate, using a function, an optimized fit for the resampled mirror measurement.

A system or computer readable medium may be configured to perform any combination of the above features.

A system for performing optical coherence tomography on a sample may comprise: a light source; a reference mirror with variable position; a display; a memory for storing image data that corresponds to a sample; one or more processors in communication with the memory, the one or more processors being operable to: obtain at least one calibration parameter from mirror measurements each time the system is initiated; obtain a signal from the sample; apply the at least one calibration parameter to the obtained signal, the calibration parameter being at least one of a wavenumber linearization, a dispersion correction, or a spectral flattening parameter; and generate an image from the corrected obtained signal.

The system may further comprise an optical switch and a calibration mirror configured to cause a calibration signal to be generated.

A computer readable medium may contain instructions executable by one or more processors to perform a method comprising: acquiring a first mirror measurement and a second mirror measurement, the first and second mirror measurement being collected from either side of a zero-delay line, each mirror measurement being an interferogram or a signal or a system impulse response; computing an amplitude and phase for the first mirror measurement and the second mirror measurement; resampling at least one of the first mirror measurement and the second mirror measurement to be at least one of: (i) in linear wavenumber(k) space, (ii) linear wavelength, or (iii) linear time to generate a resampled mirror measurement; and calculating, using a function, an optimized fit for the resampled mirror measurement.

A computer readable medium may store instructions executable by one or more processors to perform a method comprising: obtaining at least one calibration parameter each time the system is initiated; obtaining a signal from the sample; applying the at least one calibration parameter to the obtained signal, the calibration parameter being at least one of a wavenumber linearization, a dispersion correction, or a spectral flattening parameter; and generating an image from the corrected obtained signal.

A method of processing an optical signal to improve resolution of an optically acquired image may comprise: calibrating an optical system, the calibration comprising: acquiring, by one or more processors, a first mirror measurement and a second mirror measurement, the first and second mirror measurement being collected from either side of a zero-delay line, each mirror measurement being an interferogram or a signal or a system impulse response; obtaining, by the one or more processors, an amplitude and phase for the first mirror measurement and the second mirror measurement; calculating a dispersion compensation for at least one mirror measurement and optionally compensating for the dispersion; and calculating, using a function, an optimized fit for the mirror measurement.

The invention claimed is:

1. A method of processing an optical signal, the method comprising:
    calibrating an optical system, the calibration comprising:
    acquiring, by one or more processors, at least a first mirror measurement and a second mirror measurement, the first and second mirror measurement being collected from either side of a zero-delay line;
    obtaining, by the one or more processors, an amplitude and phase for the first mirror measurement and the second mirror measurement;
    resampling, at least one of the first mirror measurement and the second mirror measurement to be at least one of: (i) in linear wavenumber (k) space or (ii) linear wavelength or (iii) linear time, to generate a resampled mirror measurement;

performing spectral flattening on at least one mirror measurement by using an envelope calculated from a specific mirror measurement; and calculating, using a function, an optimized fit for the resampled mirror measurement.

2. The method of claim 1, wherein the function is one of a polynomial function, cubic spline fitting function, radial basis function, or a piece-wise function.

3. The method of claim 1, further comprising performing k-linearization on the mirror measurements, the mirror measurements obtained with or without use of a k-clock, and generating a resampled interferogram, wherein the resampled mirror measurement is in k-space.

4. The method of claim 3, wherein the k-linearization is performed using an interpolation function, the interpolation function being one of cubic spline interpolation, cubic interpolation or linear interpolation in k-space.

5. The method of claim 1, wherein each mirror measurement is one of an interferogram, a signal, or a system impulse response.

6. The method of claim 1, further comprising calculating a dispersion compensation for at least two mirror measurements and optionally compensating for the dispersion.

7. The method of claim 1, further comprising saving a spectral envelope calculated during spectral flattening.

8. The method of claim 1, further comprising finding a polynomial fitting order minimizing a sum of at least one of: (i) an area of a point-spread function or (ii) full-width half max (FWHM) resolution.

9. The method of claim 1, further comprising saving calibration criteria related to (i) k-linearization (KL), (ii) dispersion correction (DC), and (iii) spectral flattening (SF).

10. The method of claim 1, further comprising receiving an OCT signal or interference signal from a specimen.

11. The method of claim 10, further comprising generating a new fringe or resampling an interferogram after linear k-interpolation to k-linearize the received OCT signal or interference signal by using the KL calibration criteria.

12. The method of claim 11, further comprising performing dispersion correction on the k-linearized OCT signal or interference signal using the DC calibration criteria.

13. The method of claim 12, further comprising removing a envelope of the k-linearized and dispersion corrected OCT signal or interference signal.

14. The method of claim 10, further comprising converting the OCT signal or interference signal to an OCT image for display on a display.

15. A system, comprising:
a memory for storing image data and time-varying data that corresponds to a subject;
and one or more processors in communication with the memory, the one or more processors being operable to:
acquire, by one or more processors, at least a first mirror measurement and a second mirror measurement, the first and second mirror measurement being collected from either side of a zero-delay line, each mirror measurement being an interferogram or a signal or a system impulse response;
compute, by the one or more processors, an amplitude and phase for the first mirror measurement and the second mirror measurement;
resample, at least one of the first mirror measurement and the second mirror measurement to be at least one of: (i) in linear wavenumber(k) space, (ii) linear wavelength, or (iii) linear time to generate a resampled mirror measurement;
perform spectral flattening on at least one mirror measurement by using an envelope calculated from a specific mirror measurement; and
calculate, using a function, an optimized fit for the resampled mirror measurement.

16. The system of claim 15, wherein the function used to fit is one of a polynomial function, cubic spline fitting function, radial basis function, or a piece-wise function.

17. The system of claim 15, wherein the one or more processors are further operable to perform k-linearization on raw interferogram mirror measurements, the mirror measurements obtained with or without use of a k-clock, and generating a resampled interferogram, wherein the resampled mirror measurement is in k-space.

18. A non-transitory computer readable medium containing instructions executable by one or more processors to perform a method, comprising:
acquiring at least a first mirror measurement and a second mirror measurement, the first and second mirror measurement being collected from either side of a zero-delay line, each mirror measurement being an interferogram or a signal or a system impulse response;
computing amplitude and phase for the first mirror measurement and the second mirror measurement;
resampling, at least one of the first mirror measurement and the second mirror measurement to be at least one of: (i) in linear wavenumber(k) space, (ii) linear wavelength, or (iii) linear time to generate a resampled mirror measurement;
performing spectral flattening on at least one mirror measurement by using an envelope calculated from a specific mirror measurement; and
calculate, using a function, an optimized fit for the resampled mirror measurement.

\* \* \* \* \*